(12) United States Patent
Vanelli et al.

(10) Patent No.: US 9,580,551 B2
(45) Date of Patent: Feb. 28, 2017

(54) METHOD AND SYSTEM FOR LASER SINTERING WITH PRETREATED MATERIAL

(71) Applicant: ADVANCED LASER MATERIALS, LLC, Temple, TX (US)

(72) Inventors: Donald Lewis Vanelli, Temple, TX (US); Richard Benton Booth, Bluffon, TX (US); Bruce Thornton, Katy, TX (US)

(73) Assignee: Advanced Laser Materials, LLC, Temple, TX (US)

( * ) Notice: Subject to any disclaimer, the term of this patent is extended or adjusted under 35 U.S.C. 154(b) by 218 days.

(21) Appl. No.: 14/364,697

(22) PCT Filed: Dec. 10, 2012

(86) PCT No.: PCT/US2012/068697
§ 371 (c)(1),
(2) Date: Jun. 12, 2014

(87) PCT Pub. No.: WO2013/090174
PCT Pub. Date: Jun. 20, 2013

(65) Prior Publication Data
US 2016/0215092 A1 Jul. 28, 2016

Related U.S. Application Data

(60) Provisional application No. 61/630,443, filed on Dec. 12, 2011.

(51) Int. Cl.

| | | |
|---|---|---|
| *C08F 6/00* | (2006.01) | |
| *C08G 69/14* | (2006.01) | |
| *C08G 69/26* | (2006.01) | |
| *C08G 69/02* | (2006.01) | |
| *C08L 77/02* | (2006.01) | |
| *C08L 77/06* | (2006.01) | |
| *C08G 85/00* | (2006.01) | |
| *B29B 13/02* | (2006.01) | |
| *C08F 10/02* | (2006.01) | |
| *C08F 10/06* | (2006.01) | |
| *C08J 3/00* | (2006.01) | |
| *B29C 67/00* | (2006.01) | |
| *B33Y 70/00* | (2015.01) | |

(52) U.S. Cl.
CPC ............ *C08G 69/14* (2013.01); *B29B 13/021* (2013.01); *C08F 10/02* (2013.01); *C08F 10/06* (2013.01); *C08G 69/02* (2013.01); *C08G 69/26* (2013.01); *C08G 69/265* (2013.01); *C08G 85/002* (2013.01); *C08L 77/02* (2013.01); *C08L 77/06* (2013.01); *B29C 67/0077* (2013.01); *B33Y 70/00* (2014.12)

(58) Field of Classification Search
CPC ................................. C08F 6/005; C08F 6/003
USPC .................................................. 528/480, 500
See application file for complete search history.

(56) References Cited

U.S. PATENT DOCUMENTS

| | | | | |
|---|---|---|---|---|
| 2004/0102539 A1* | 5/2004 | Monsheimer | .......... | C08G 69/26 522/2 |
| 2004/0138344 A1* | 7/2004 | Allen | .................. | B29C 67/0077 523/326 |
| 2005/0027050 A1* | 2/2005 | Monsheimer | ............ | C08K 3/26 524/230 |
| 2006/0071359 A1* | 4/2006 | Monsheimer | ....... | B29C 67/0077 264/113 |

* cited by examiner

*Primary Examiner* — Terressa Boykin
(74) *Attorney, Agent, or Firm* — Smith, Gambrell & Russell

(57) ABSTRACT

For laser sintering, a material includes at least one powder that has been treated by heat to modify at least one of: a melting temperature of the at least one powder; and a recrystallization temperature of the at least one powder and results in the narrowing of the melting curve of the treated material relative to the untreated material. The heating can include a series of heating steps. The treatment improves the efficacies of the SLS process and product quality.

39 Claims, 28 Drawing Sheets

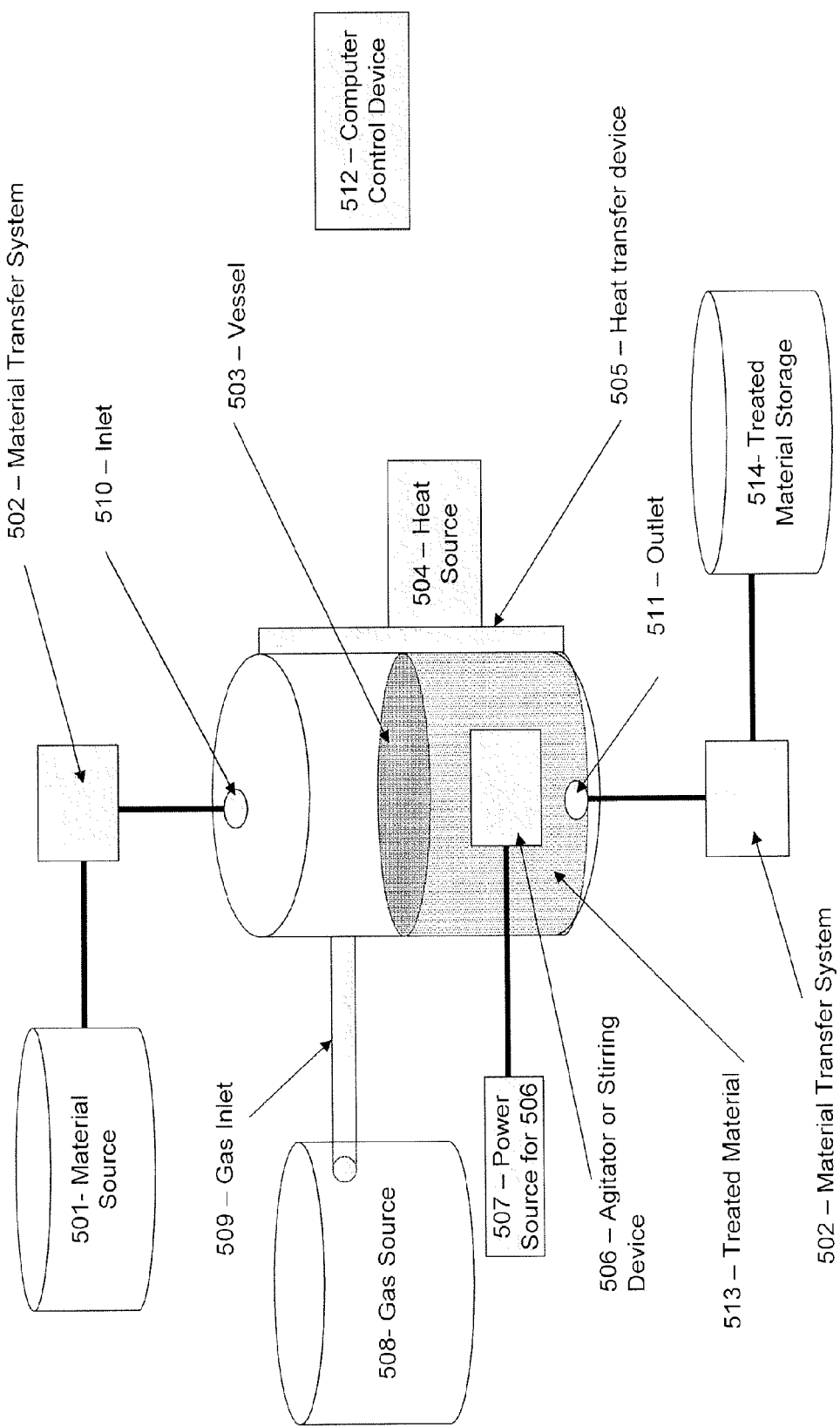
Figure 5-1. System 500

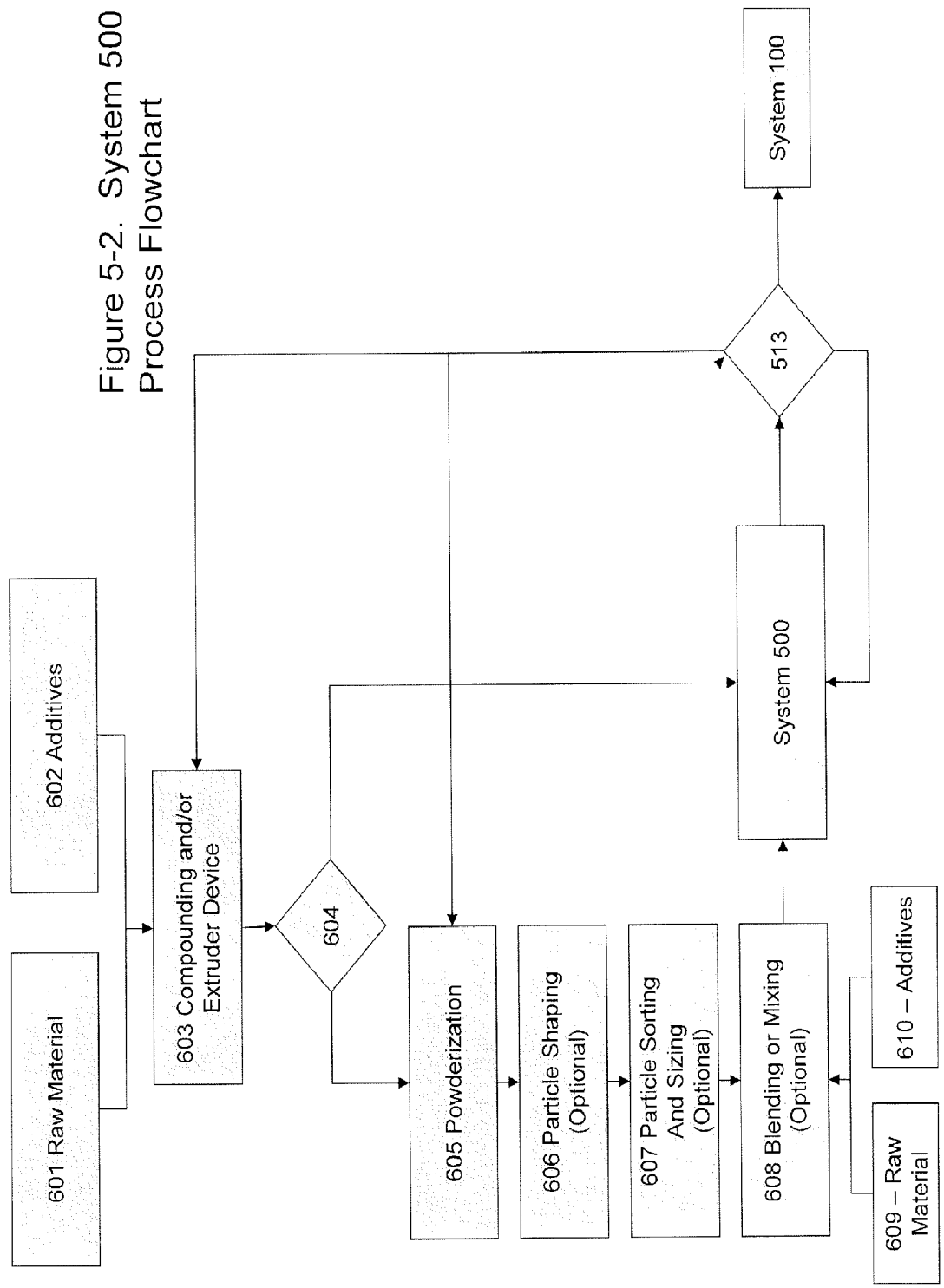
Figure 5-2. System 500 Process Flowchart

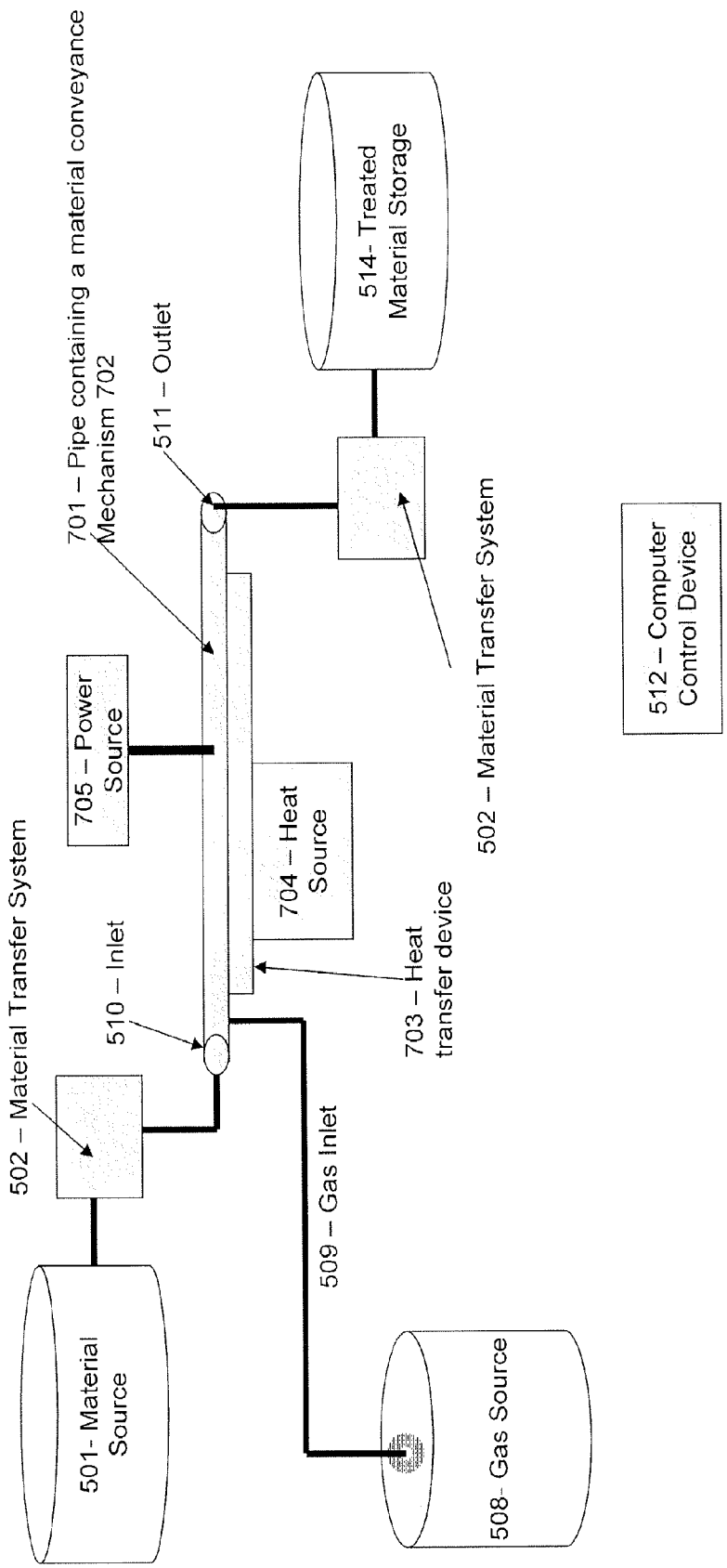
Figure 5-3. System 500 Continuous Treatment Modification

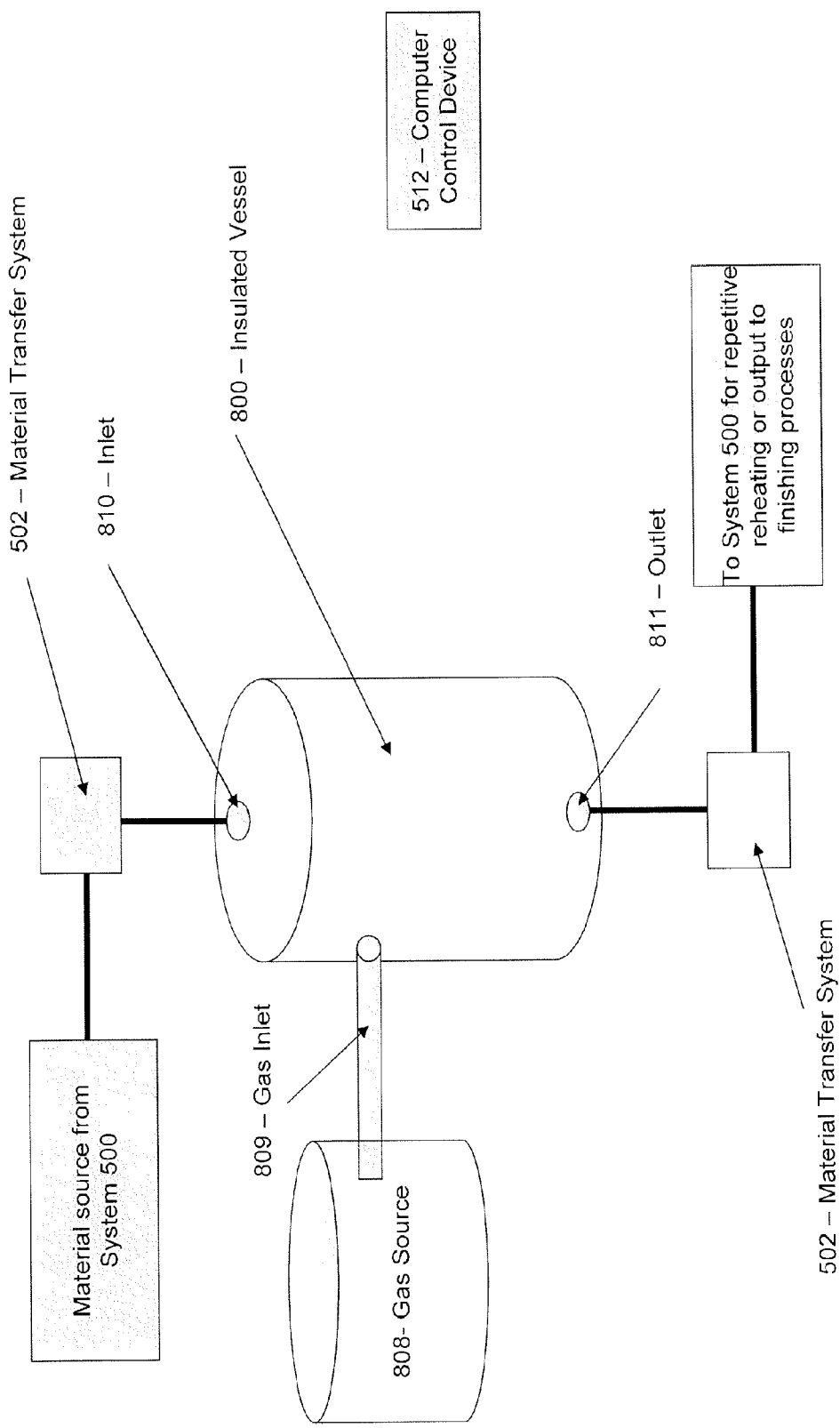
Figure 5-4. System 500 Storage and Recirculation

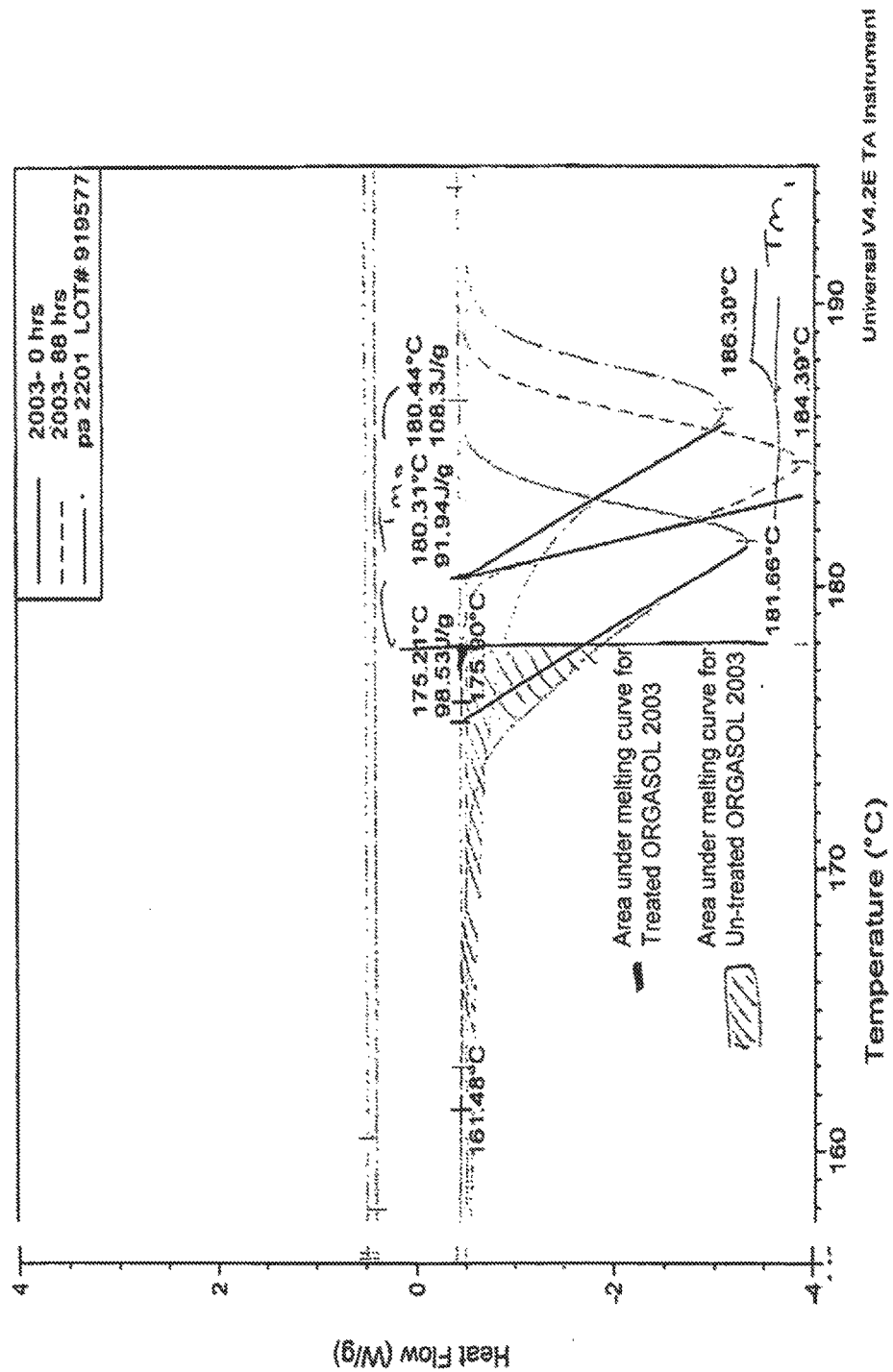
Figure 9  Comparison of areas under melting curve Of polymers treated by the system 300 and un-treated polymers

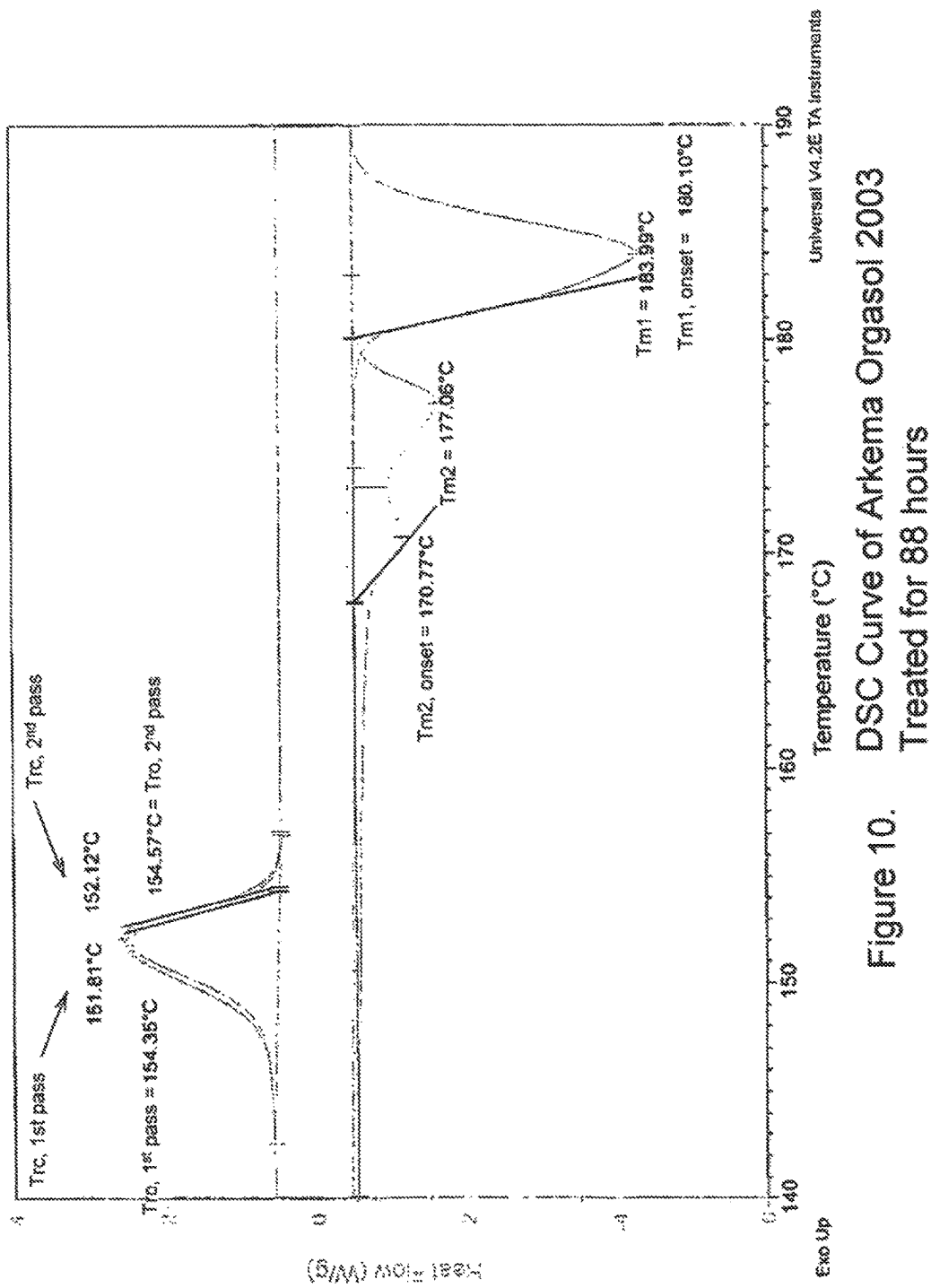
Figure 10. DSC Curve of Arkema Orgasol 2003 Treated for 88 hours

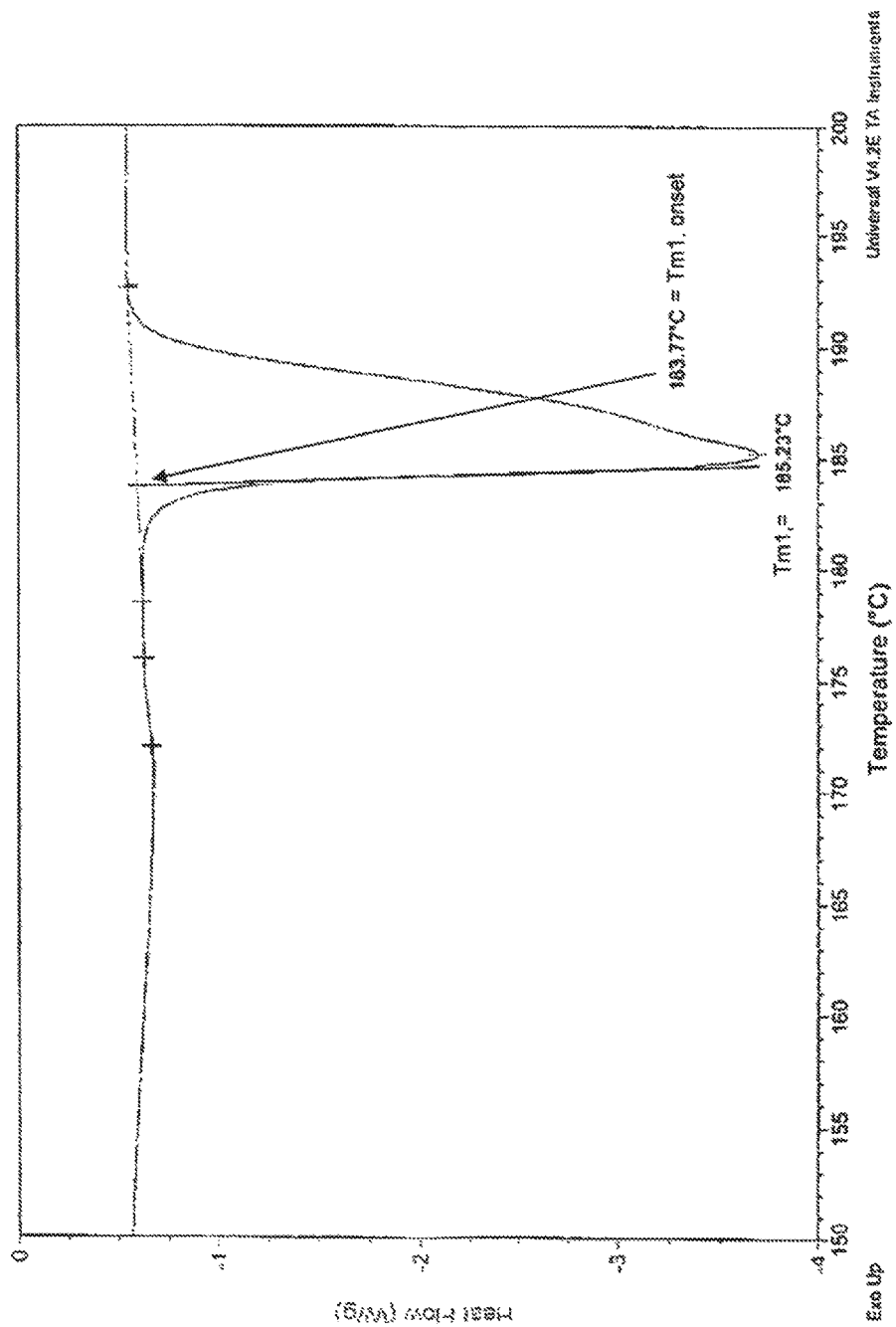
Figure 11. DSC Curve of Arkema Orgasol 2003 Treated for 88 and a further 87 hours

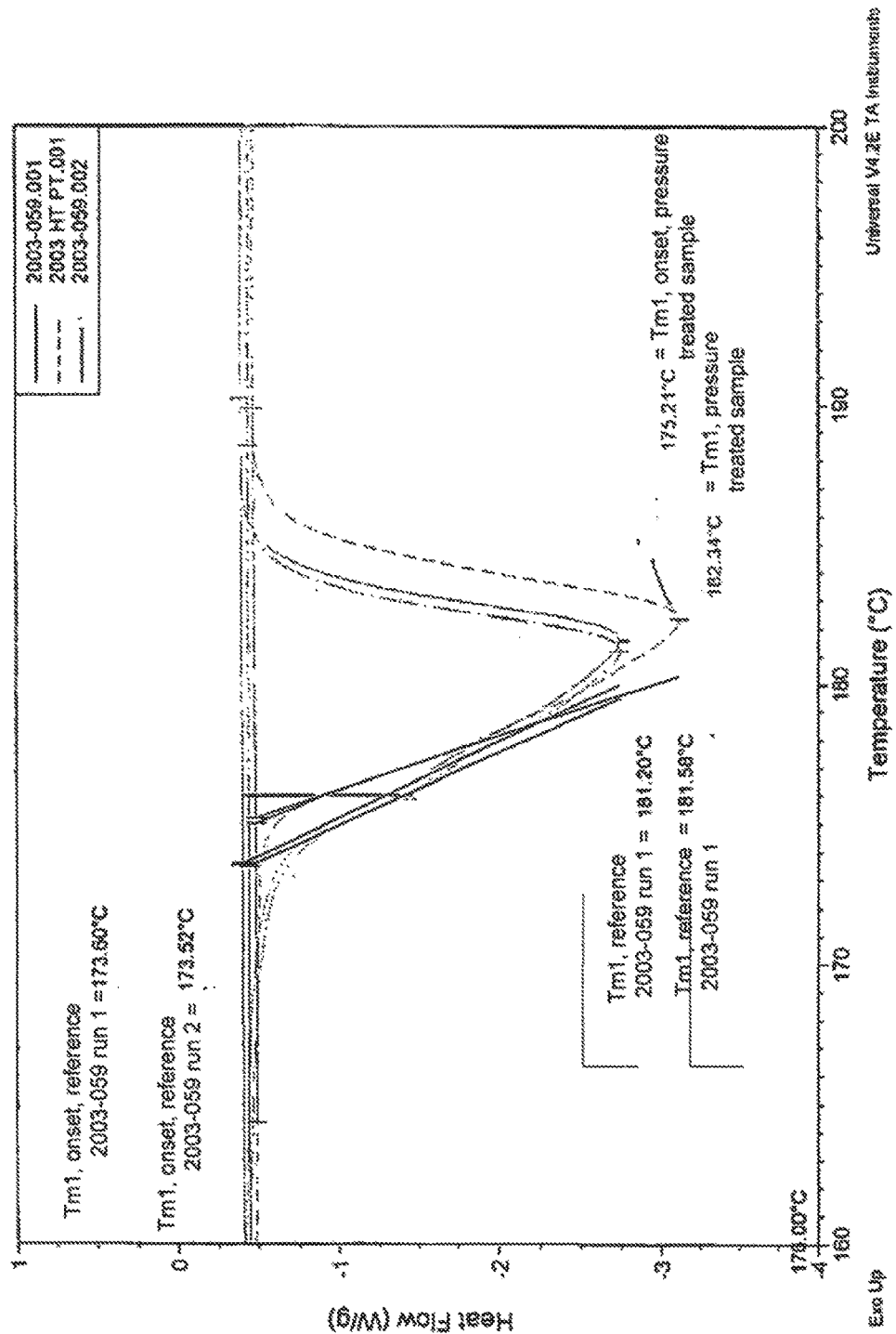
Figure 12. Pressure Treated Samples

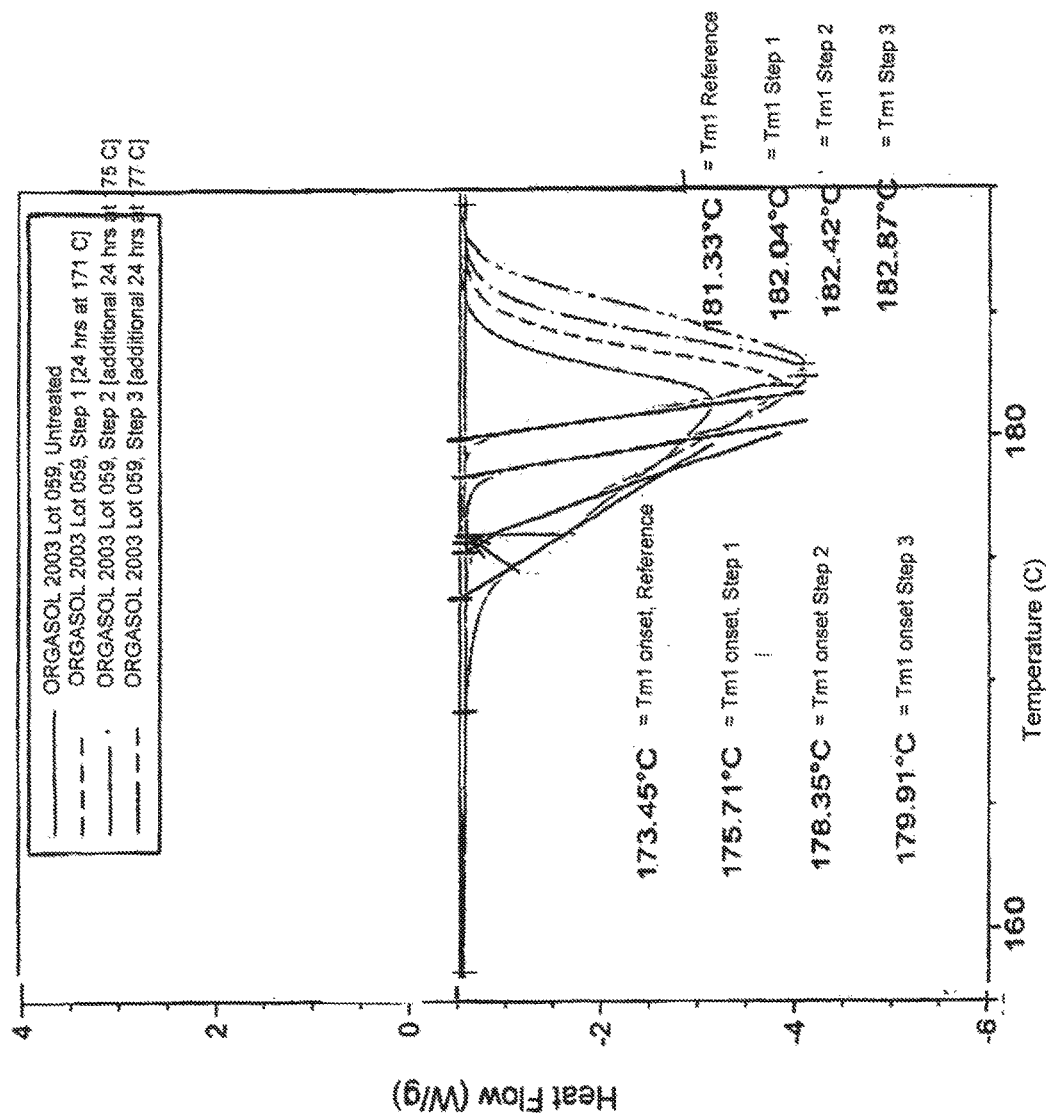
Figure 13. Stepped Treatment Process Samples

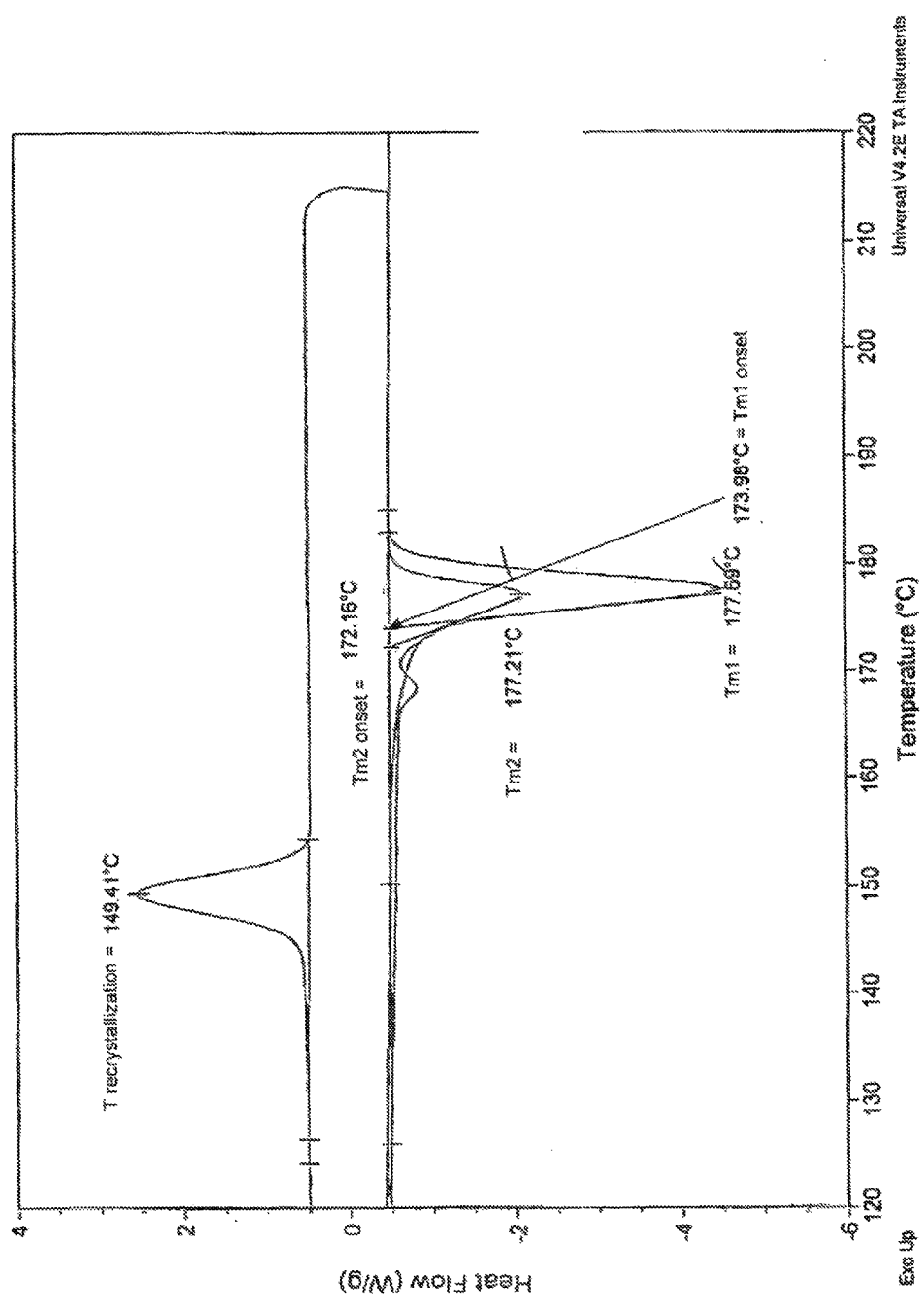
Figure 14. ORGASOL 2002 Untreated

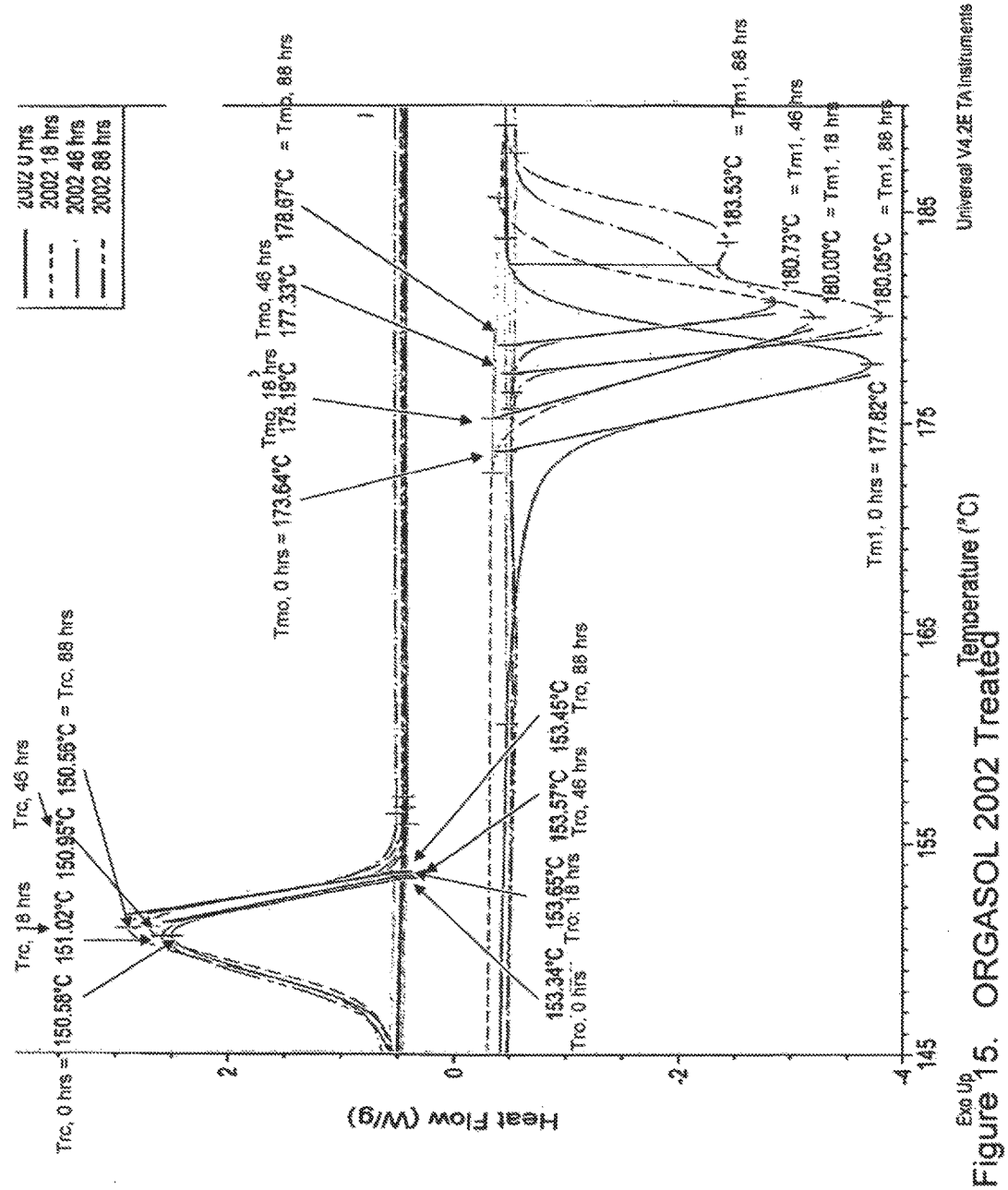
Figure 15. ORGASOL 2002 Treated

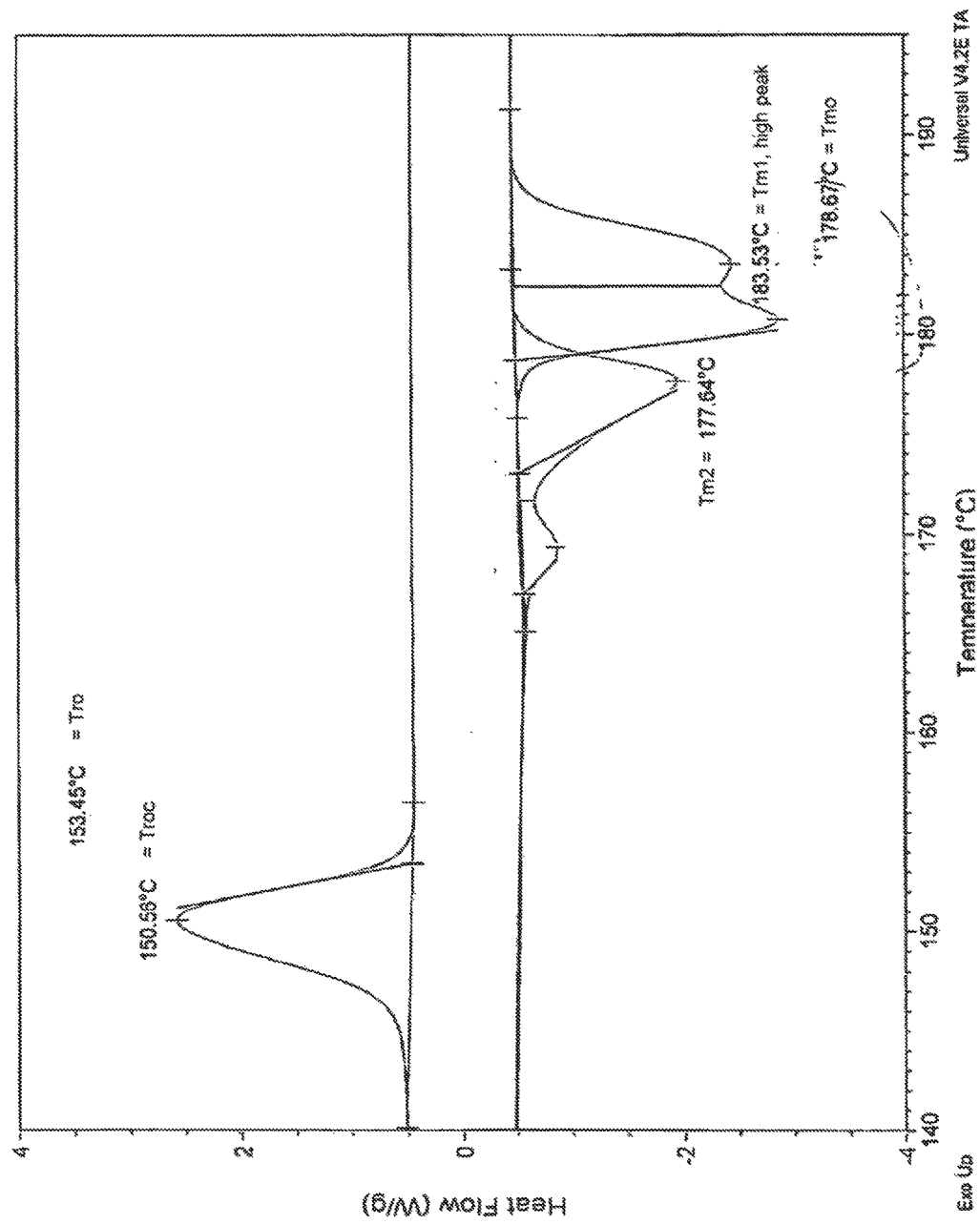
Figure 16. ORGASOL 2002 Treated, 88 hours

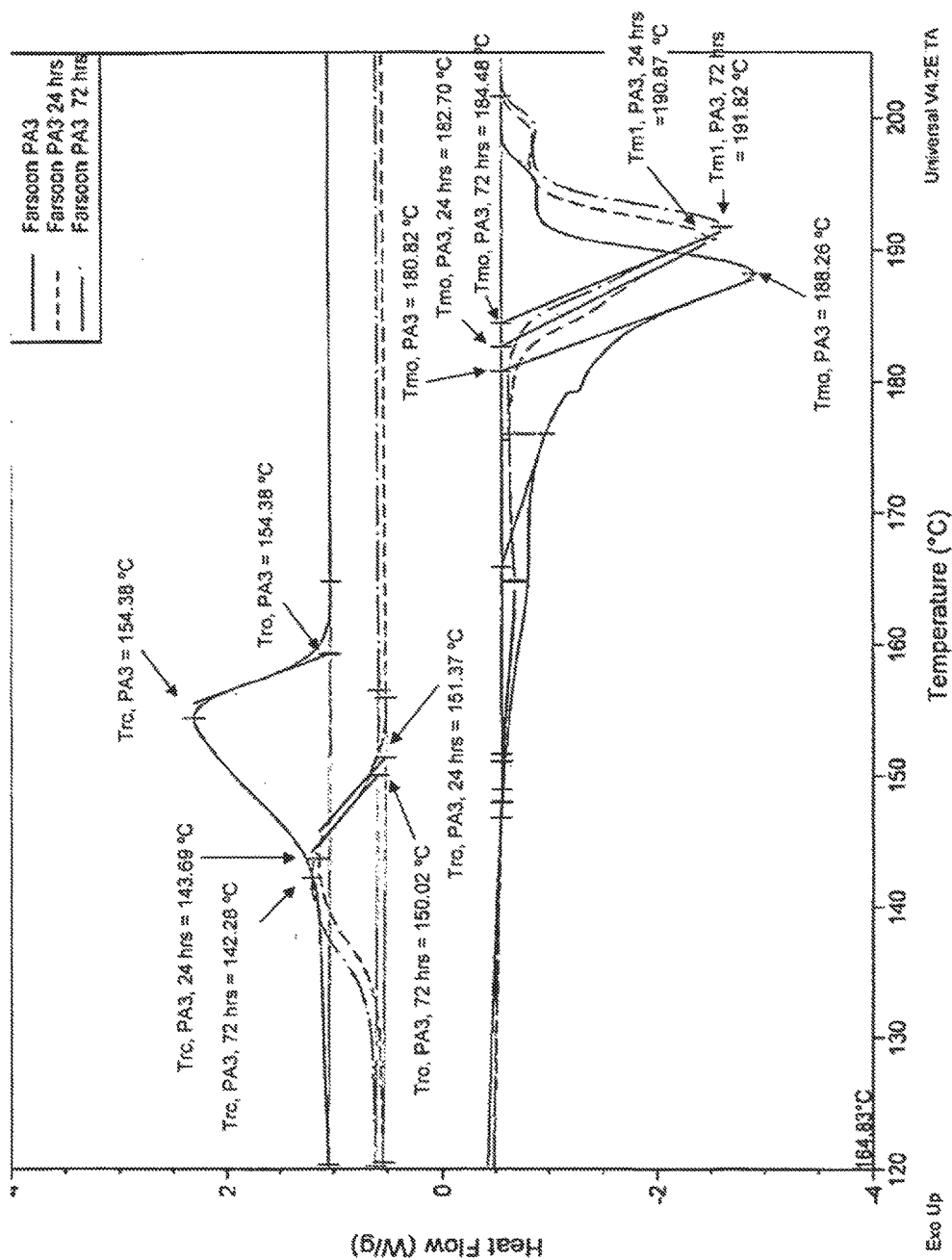
Figure 17. FARSOON PA3 Reference & Treated

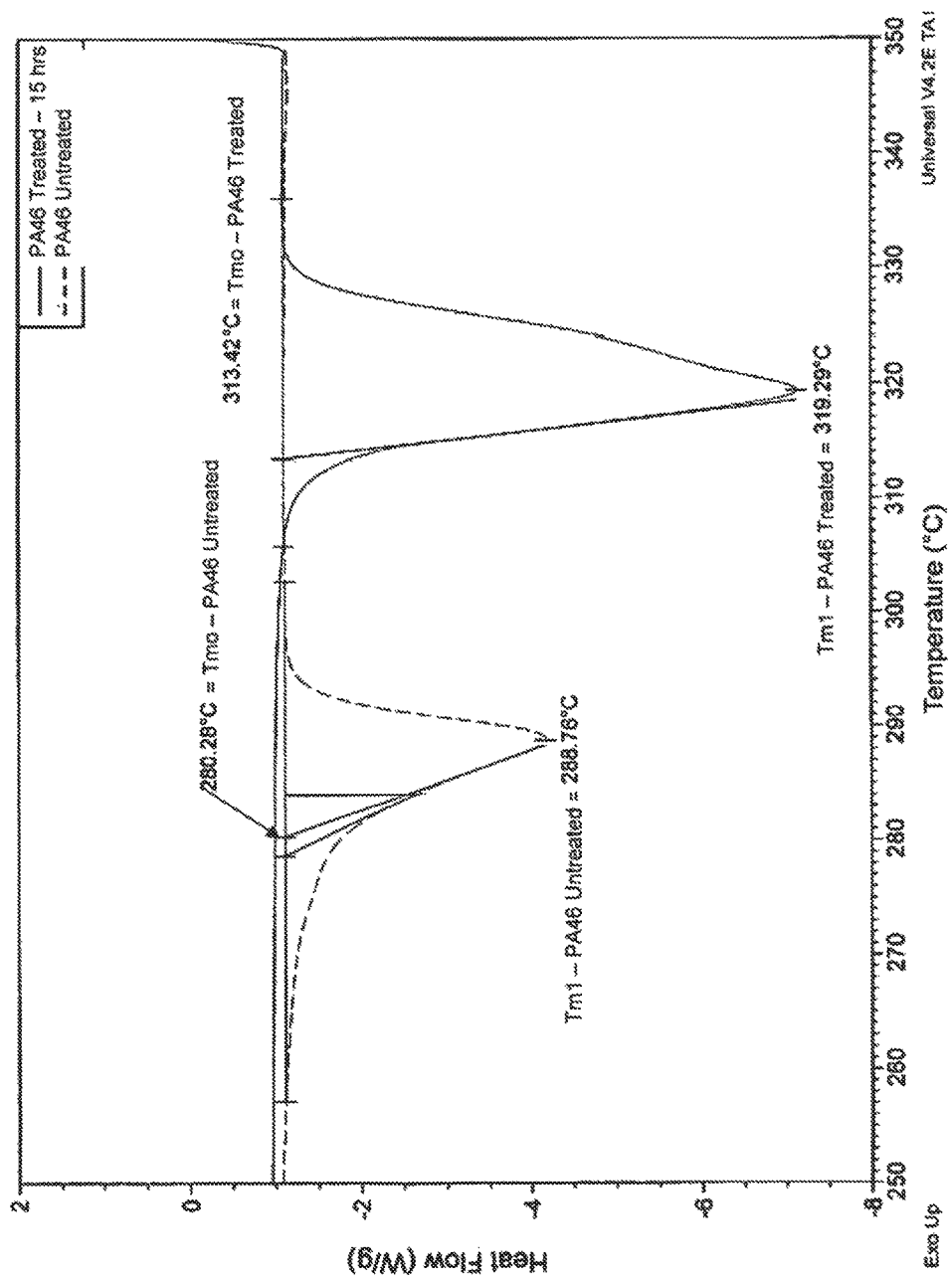
Figure 18. Nylon 46 Reference & Treated Samples

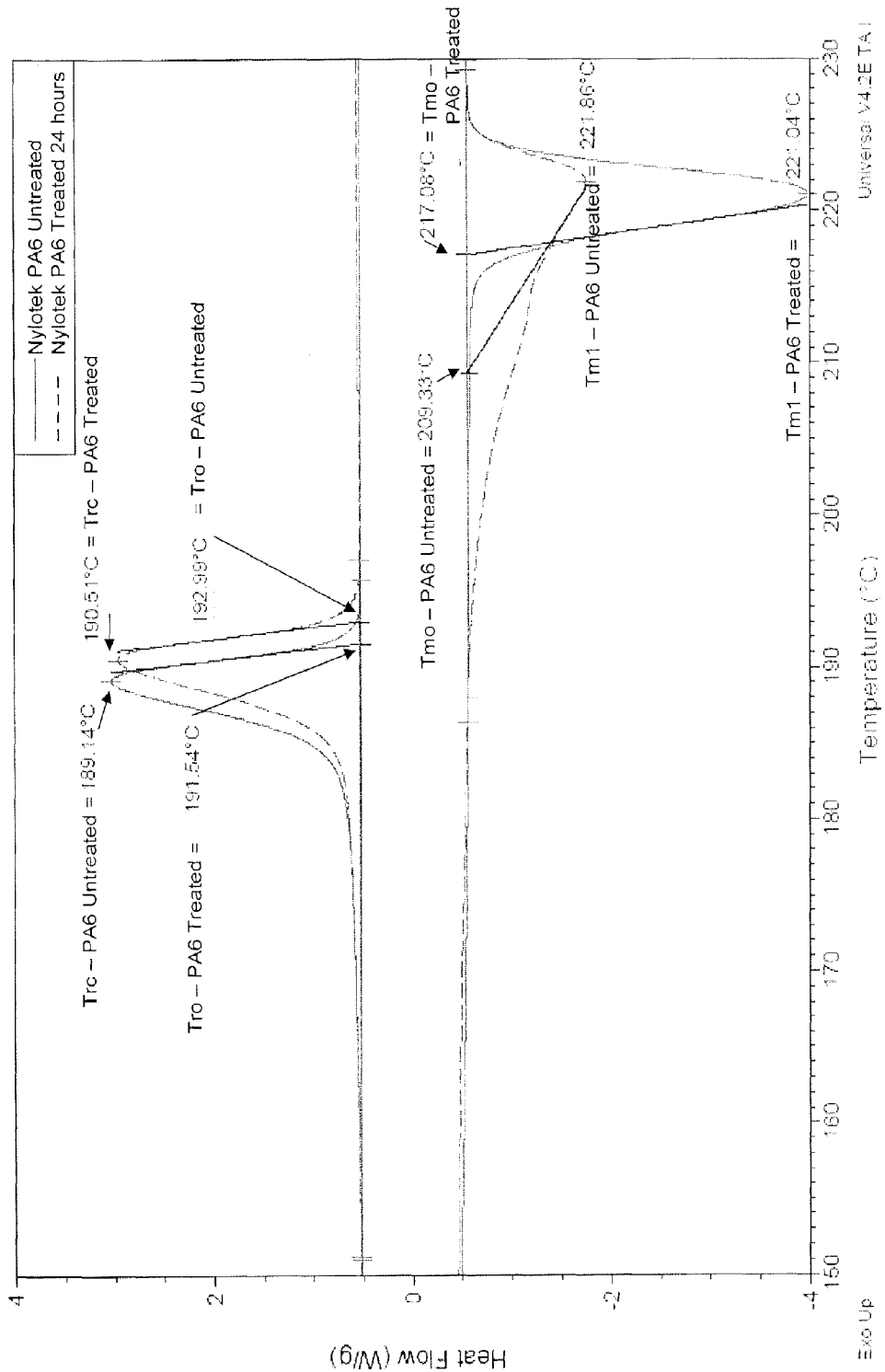
Figure 19. Nylon 6 Reference & Treated Samples

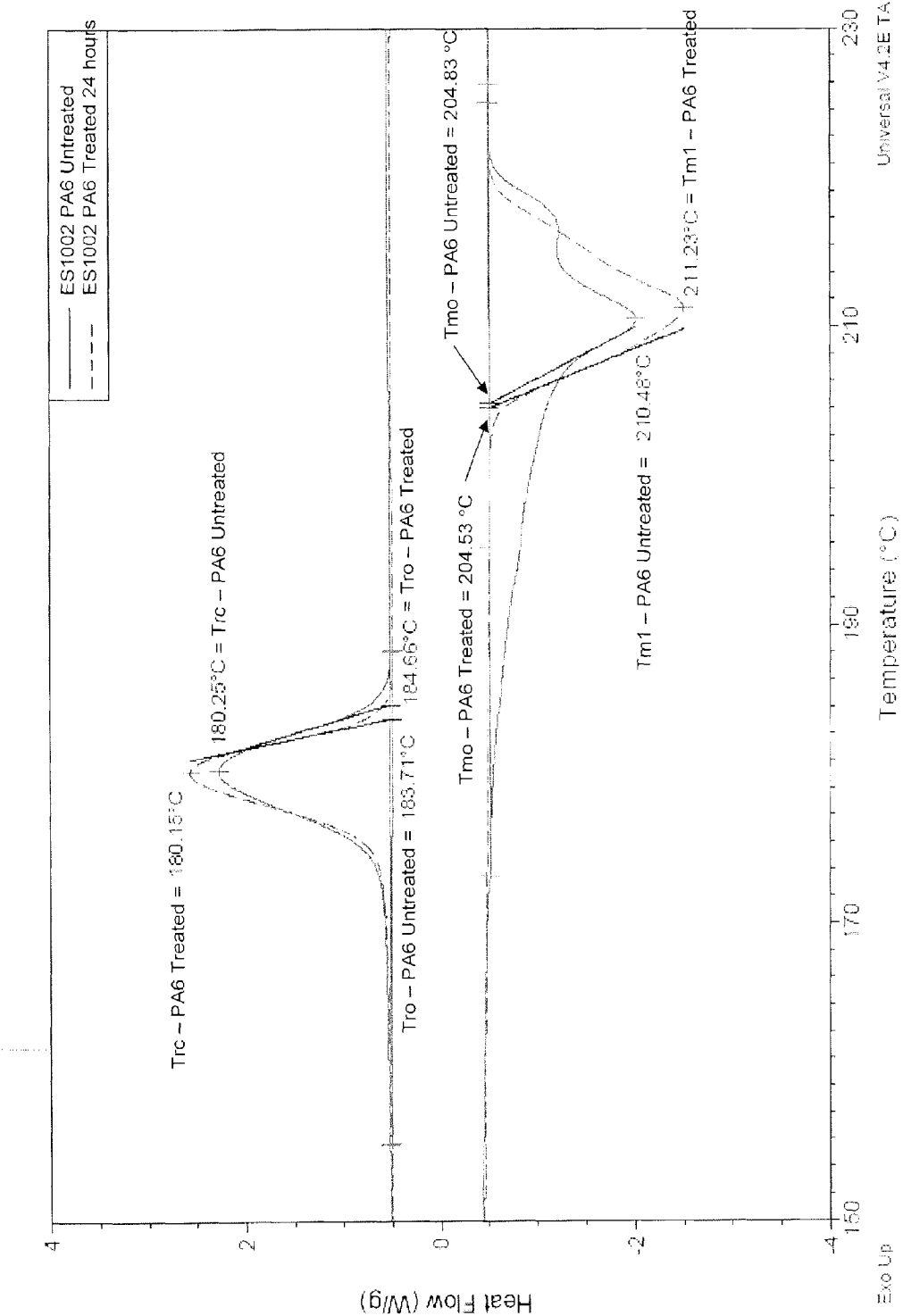
Figure 20. Nylon 6 Reference & Treated Samples

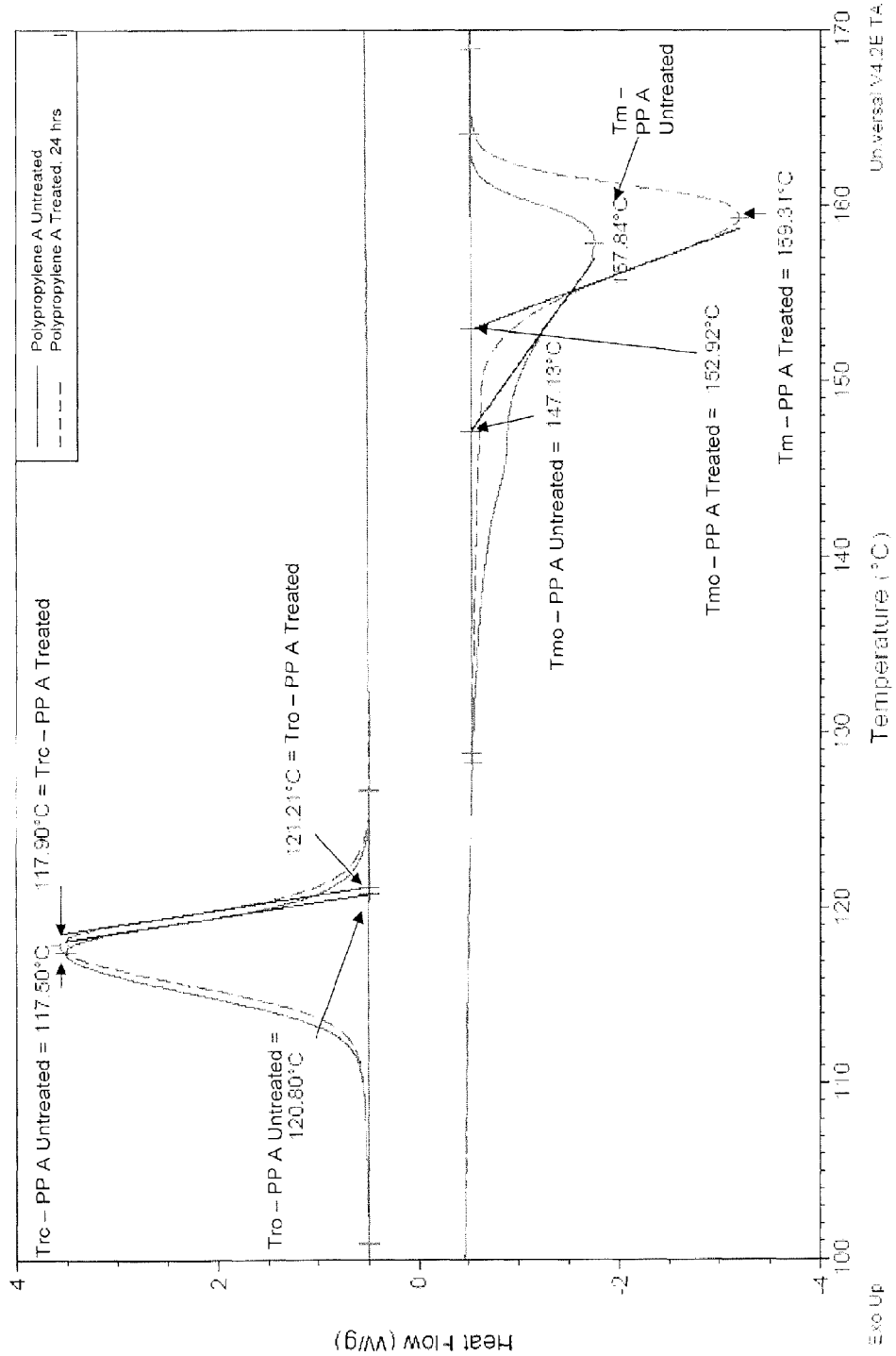
Figure 21. Polypropylene "A" Reference & Treated Samples

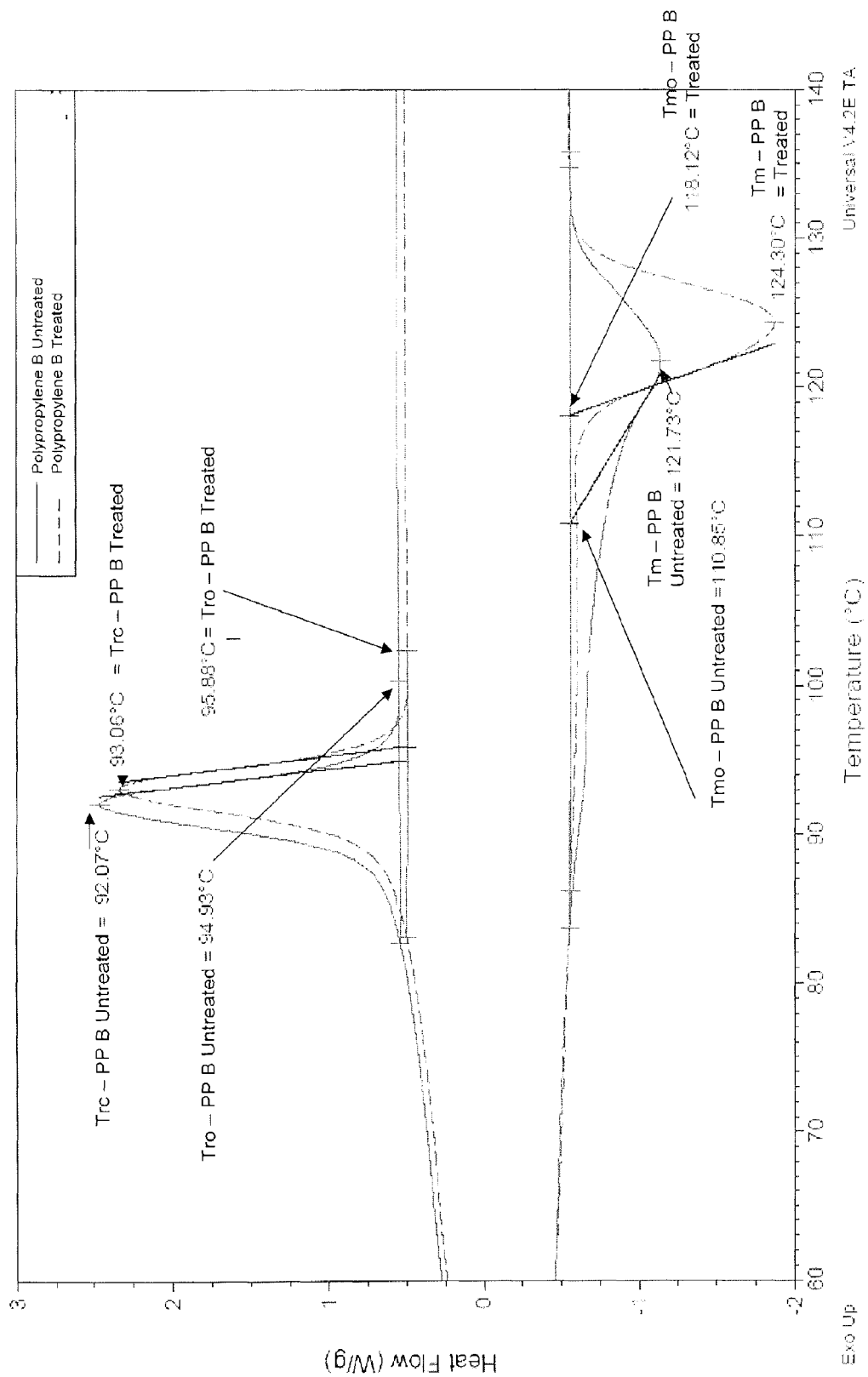
Figure 22. Polypropylene "B" Reference & Treated Samples

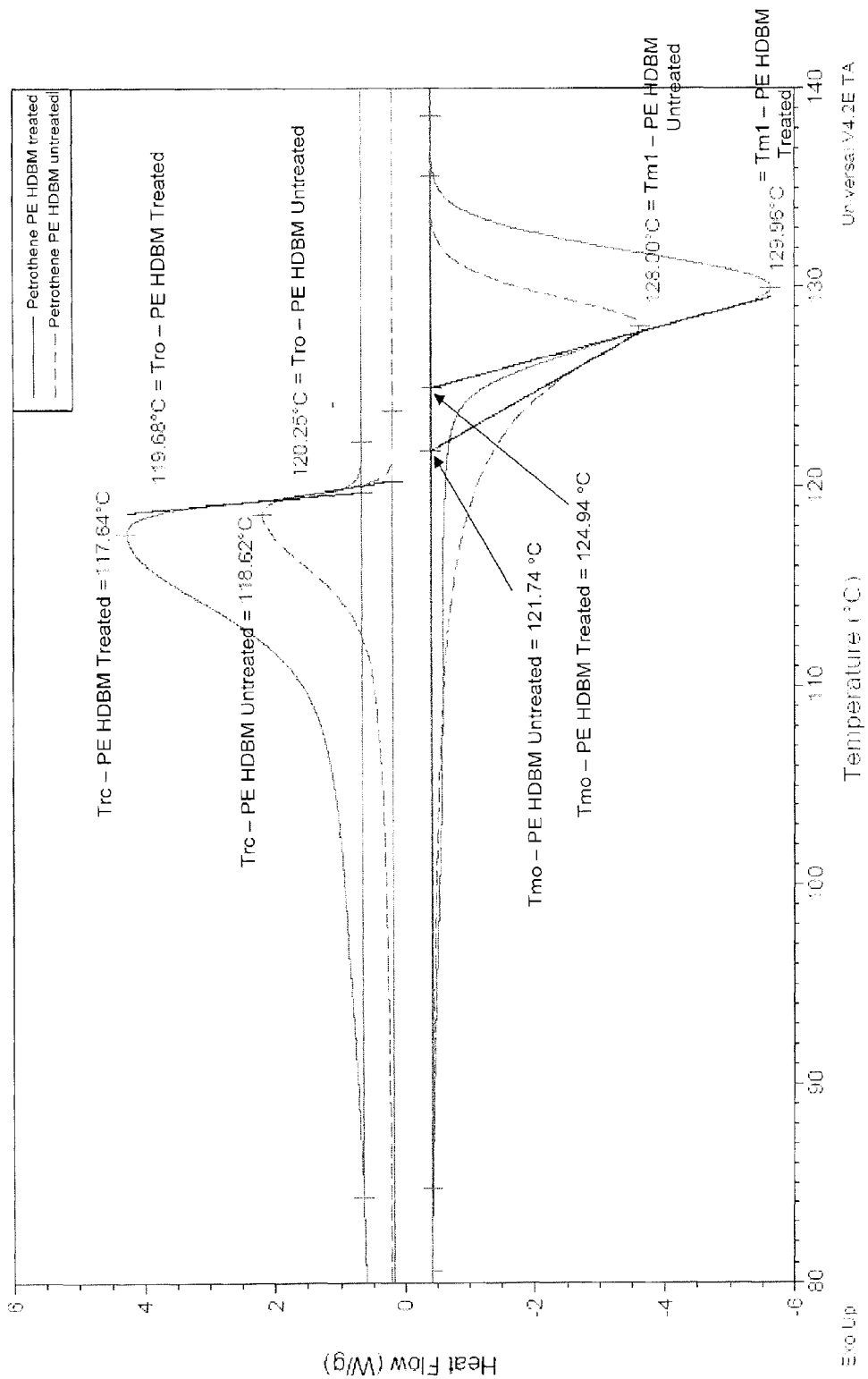
Figure 23. Polyethylene Reference & Treated

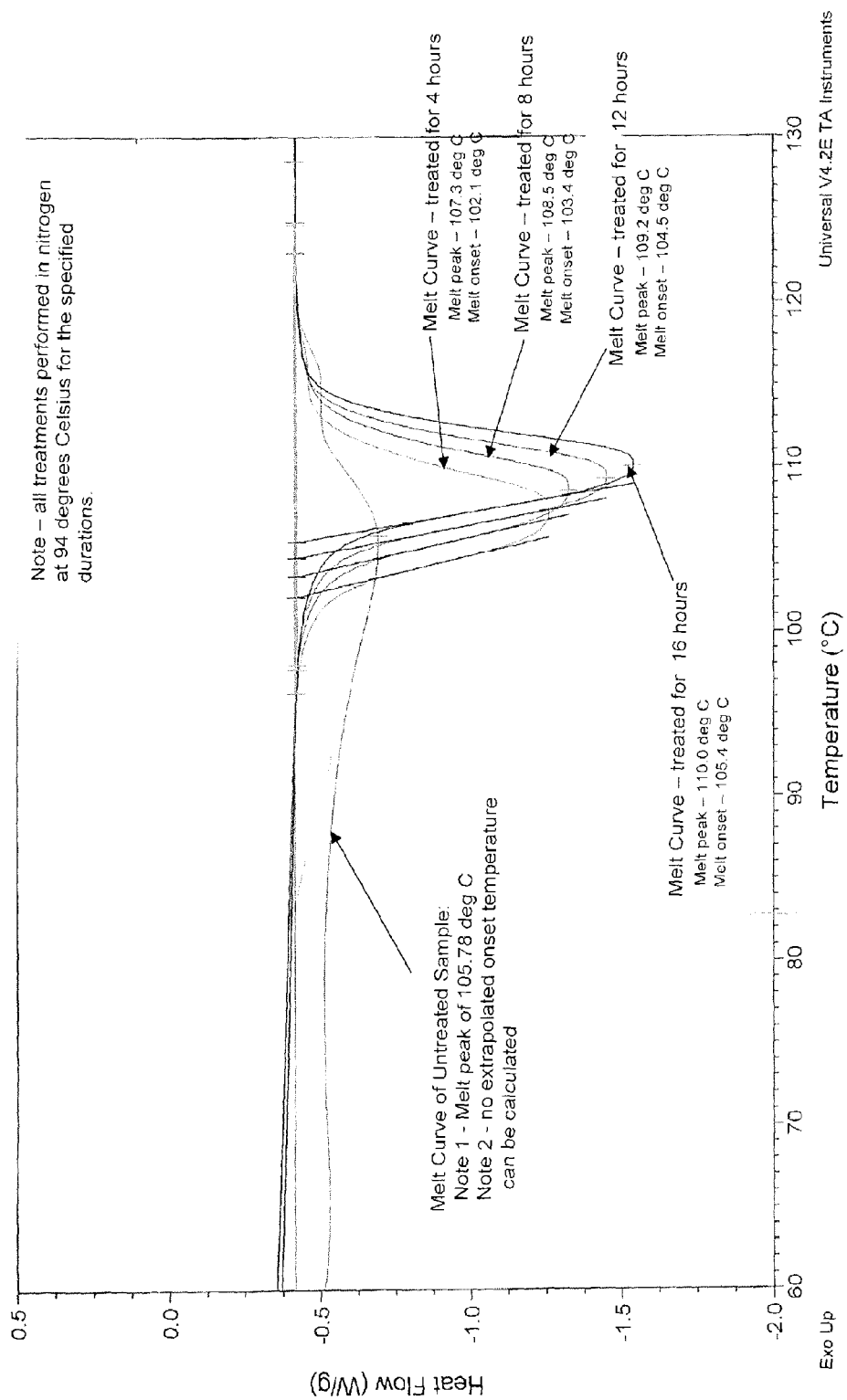
Figure 24. Platimid (PA6, PA66, PA12 ter-polymer) treated and untreated reference sample.

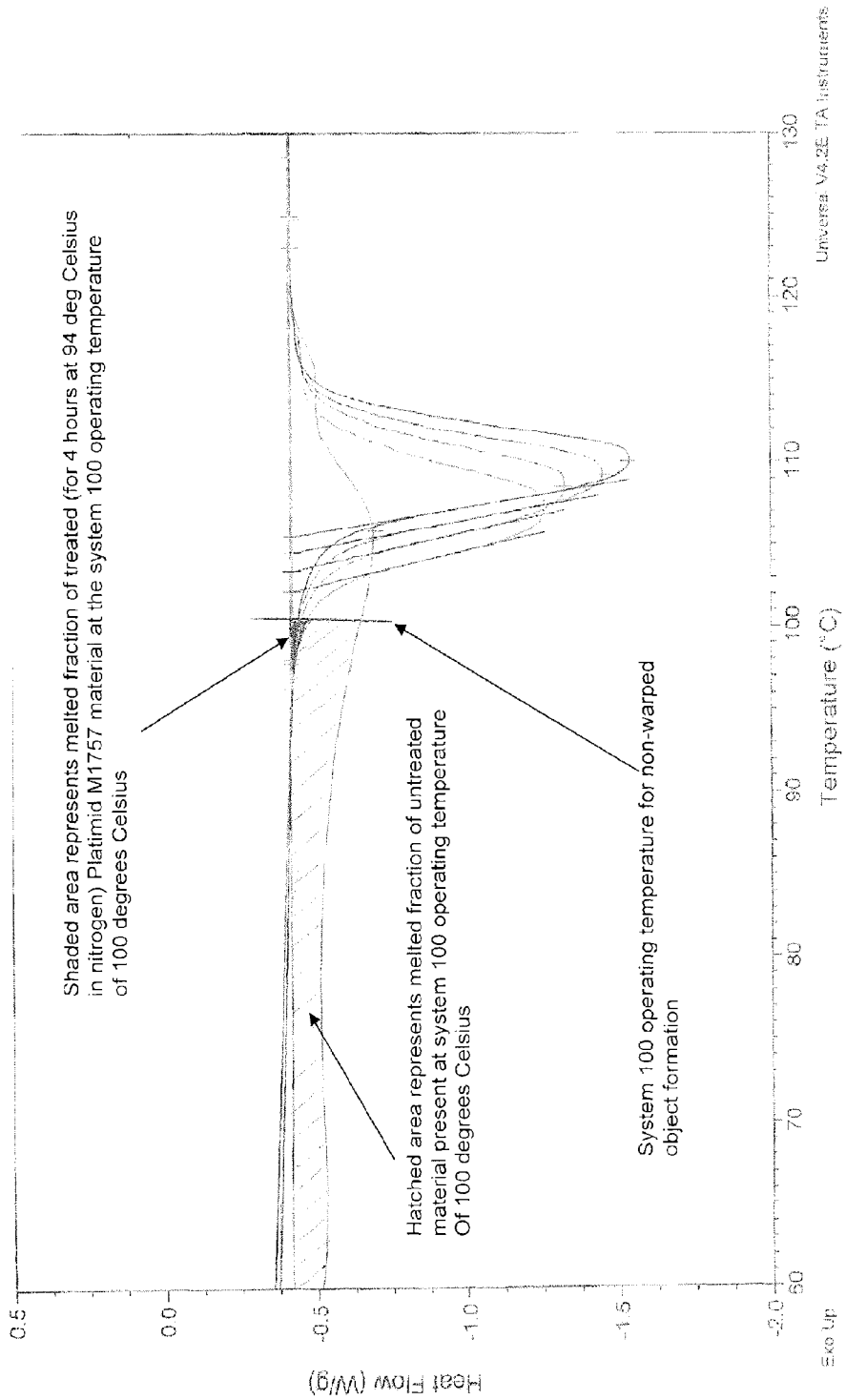
Figure 25. Platimid (PA6, PA66, PA12 ter-polymer) with melted fraction at system 100 operating temperature.

METHOD AND SYSTEM FOR LASER SINTERING WITH PRETREATED MATERIAL

BACKGROUND

The disclosures herein relate in general to powder based additive manufacturing, and in particular to a method and system for heat induced sintering or melting with pretreated material for additive manufacturing.

A commercial used method for powder based additive manufacturing is selective laser sintering ("SLS") processing. This process is useful for solid freeform fabrication of three-dimensional objects. For SLS processing, viable materials include polymers (e.g., nylon type materials). Nevertheless, a wider range of such materials is desired.

BRIEF DESCRIPTION OF THE SEVERAL VIEWS OF THE DRAWINGS

FIGS. 5-1, 5-2, 5-3, and 5-4 illustrate a treatment system of the illustrative embodiment (System 500).

FIG. 9 is an example DSC trace of the material of FIG. 6, the material of FIG. 7, and the material of FIG. 8, in comparison to one another.

FIG. 10 is an example DSC trace of the material of FIG. 7 after pretreating according to a second version of the illustrative embodiments.

FIG. 11 is an example DSC trace of the material of FIG. 10 after pretreating according to a third version of the illustrative embodiments.

FIG. 12 is an example DSC trace of the material of FIG. 7 after pretreating according to a fourth version of the illustrative embodiments.

FIG. 13 is a first example DSC trace of the material of FIG. 7 after pretreating according to a fifth version of the illustrative embodiments.

FIG. 14 is an example DSC trace of a sample of ARKEMA ORGASOL 2002 nylon-12 material.

FIG. 15 is an example DSC trace of the material of FIG. 14 after pretreating according to a sixth version of the illustrative embodiments.

FIG. 16 is an example DSC trace of the material of FIG. 14 after pretreating according to a seventh version of the illustrative embodiments.

FIG. 17 is an example DSC trace of FARSOON PA3 nylon material, before and after treating according to the illustrative embodiments.

FIG. 18 is an example DSC trace of a nylon 46 material, before and after treatment according to the illustrative embodiments.

FIG. 19 is an example DSC trace of a Nylotek nylon 6 material, before and after treatment according to the illustrative embodiments.

FIG. 20 is an example DSC trace of a nylon 6 material, Arkema Orgasol ES 1002, before and after treatment according to the illustrative embodiments.

FIG. 21 is an example DSC trace of a Polypropylene material, Polypropylene A, before and after treatment according to the illustrative embodiments.

FIG. 22 is an example DSC trace of a Polypropylene material, Polypropylene B, before and after treatment according to the illustrative embodiments.

FIG. 23 is an example DSC trace of a polyethylene material, Petrothene PE HDBM, before and after treatment according to the illustrative embodiments.

FIG. 24 is an example DSC trace of a polyamide terpolymer, Platimid M1757 (polyamide 6, polyamide 66, polyamide 12), before and after treatment according to the illustrated embodiments.

FIG. 25 is an example DSC trace of Platimid M1757 with melted fraction at system 100 operating temperature.

DETAILED DESCRIPTION

Figure 1:
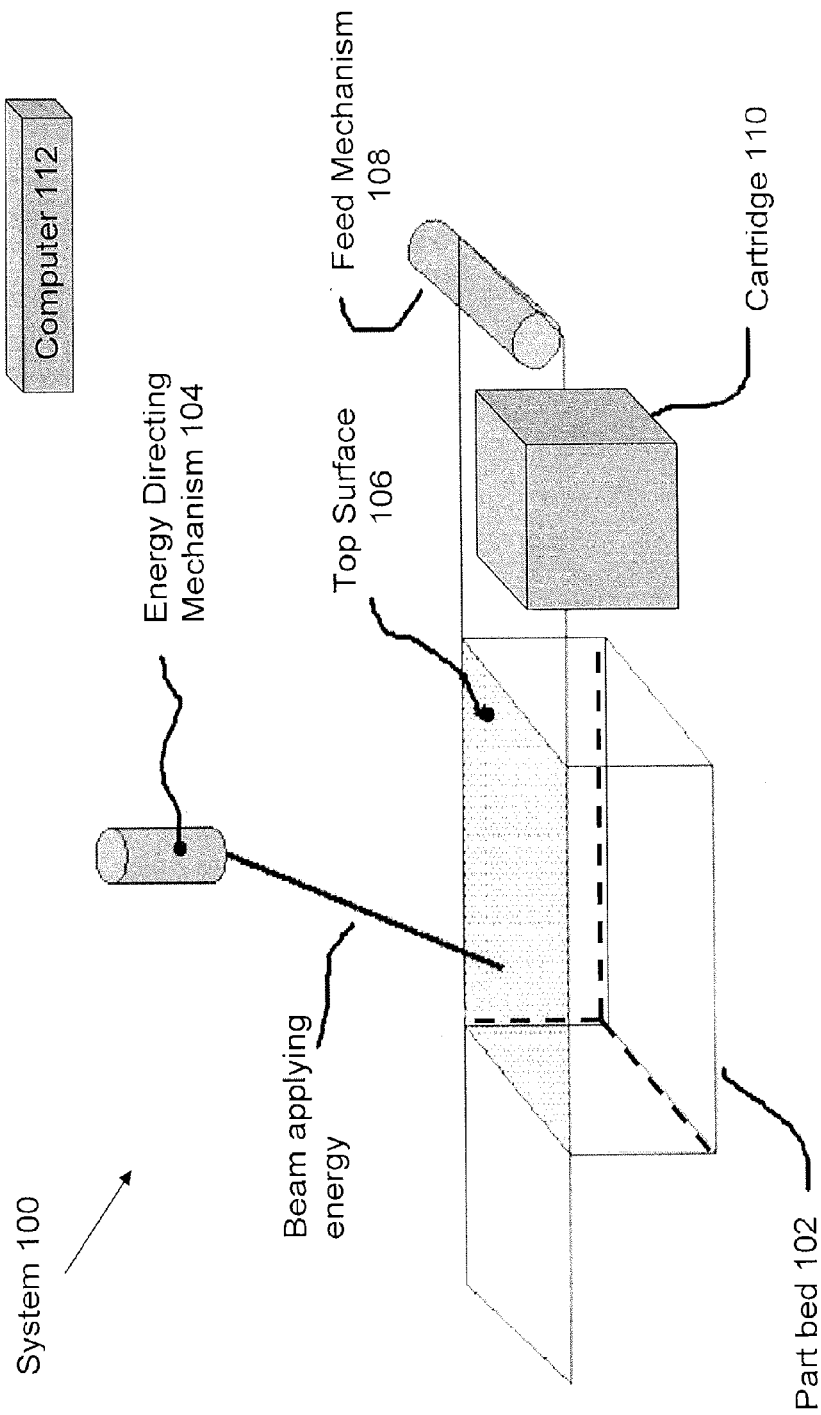
FIG. 1 is a perspective schematic view of an SLS system of the illustrative embodiment (System 100).
Figure 2:
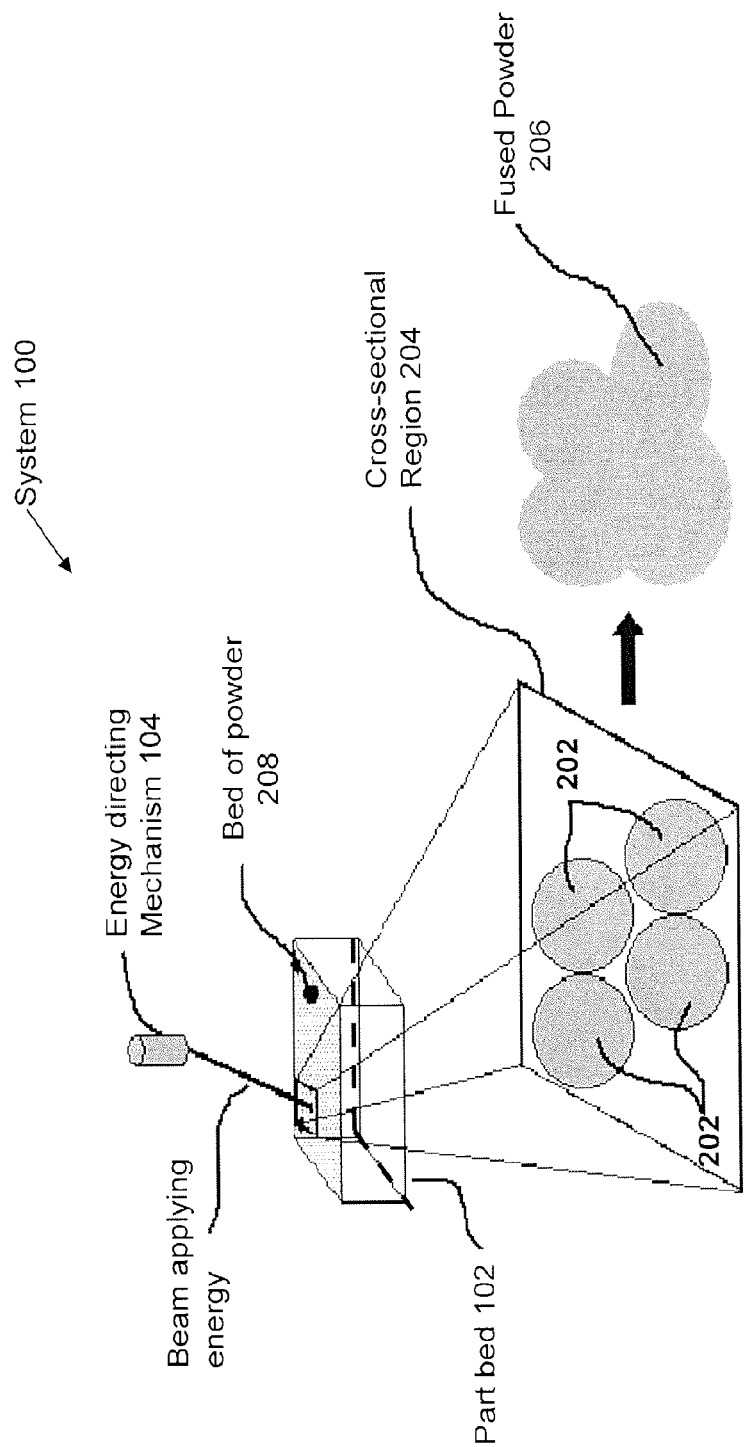
FIG. 2 is a perspective schematic cutaway view of the system of FIG. 1.

FIG. 1 is a perspective schematic view of an SLS system, indicated generally at 100, of the illustrative embodiment. FIG. 2 is a perspective schematic cutaway view of the system 100. The system 100 forms objects by processing powder materials. As shown in FIG. 1, the system 100 includes at least a part bed 102, an energy-directing mechanism 104 (e.g., a CO2 laser) for directing energy onto a top surface 106 of the part bed 102, a feed mechanism 108 (e.g., a roller, blade or other spreader) for distributing smooth layers of unfused powder from a cartridge 110 onto the part bed 102, and a computer 112 for automatically controlling operation of the system 100. For clarity, FIG. 1 does not show various connections between the computer 112 and other components of the system 100. In turn, the computer 112 operates in response to instructions from a human user (not shown in FIG. 1).

In the illustrative embodiment, the part bed 102 is located within an oxygen-controlled cabinet or chamber, and the system 100 maintains a suitable temperature for powder on the part bed 102 (e.g., with a heater). Within a first layer of powder on the top surface 106, in response to signals from the computer 112: (a) the energy-directing mechanism 104 directs energy to hit powder 202 within a cross-sectional region 204 as shown in FIG. 2; (b) such directed energy elevates a temperature of the cross-sectional region 204 enough to soften and fuse together the powder 202 within the cross-sectional region 204, so that it becomes fused powder 206 as shown in FIG. 2; and (c) in the same manner, the system 100 is operable to selectively fuse powder within one or more other cross-sectional regions to form a first layer of an object, which is specified by the computer 112. In one example, such fusion is achieved by softening outside surfaces of the powder's particles (e.g., by partially melting them), so that they fuse (or "stick") to one another, irrespective of whether they completely melt.

After the system 100 forms the first layer of the object, the system 100: (a) lowers the part bed 102 by a specified layer thickness; (b) raises the cartridge 110 of feed powder by a further specified layer thickness; (c) with the feed mechanism 108, smoothly distributes (e.g., spreads) a second layer of powder from the cartridge 110 onto the first layer of powder; and (d) selectively fuses powder within one or more cross-sectional regions to form a second layer of the object (within the second layer of powder) and to fuse the second layer of the object to the first layer of the object. In the same manner, the system 100 repeats such process to form successive layers of the object (within successive layers of powder), until the object's entire shape is formed. Accordingly, the system 100 performs laser sintering as an additive layer digital manufacturing technique, in which the system 100 repeatedly: (a) over a horizontal plane, spreads layers of powder, which collectively form a bed of powder 208 as shown in FIG. 2; and (b) uses the energy-directing mechanism 104 (e.g., an infrared laser beam or electron beam) to selectively fuse (e.g., sinter) cross-sectional regions within those layers.

The object (or "part") is a three dimensional solid object, and the layers are relatively thin (e.g., typically less than 0.010 inches per layer). During the object's formation, the remaining unfused (e.g., unsintered) powder, which is excluded from the object, remains in place to physically support the various layers of powder. After the object's entire shape is formed, the remaining unfused powder is separated from the object. Accordingly, the remaining unfused powder is soft enough to recover the sintered object from the powder. In one example, the remaining unfused powder is processed (e.g., partially reused, and/or blended with fresh powder) for making another object.

Preferably, the object is useful, has a desired size and shape, and has other properties (e.g., strength, ductility, hardness and conductance) for achieving the object's intended purpose. To make either prototype or functional objects, successful use of the system 100 partly depends on the powder's melting behavior. For example, the object's properties are influenced by the powder's base materials, ingredients blended with those base materials, and operating conditions of the system 100.

During the object's formation, the system 100 maintains a specified temperature for the bed of powder 208, so that the fused powder 206 remains partially molten as more layers are added to the bed of powder 208 and selectively melted. For example, if the system 100 maintains a temperature that is too low for the bed of powder 208 (e.g., too near such powder's recrystallisation point), then the fused powder 206 may return to a solid state (or "recrystallize") too quickly, which may cause the formed object to warp or deform. However, if the system 100 maintains a temperature that is too high for the bed of powder 208 (e.g., too near such powder's melting point), then the remaining unfused powder may partially melt, which may increase the relative difficulty of separating the remaining unfused powder from the formed object.

Preferably, for SLS processing, the powder has a relatively large positive difference between a temperature at which the powder melts ("Tm") and a temperature at which the powder recrystallizes ("Trc"). For example, during the object's formation, if the bed of powder 208 has a relatively large positive difference between Tm and Trc ($\Delta T = Tm - Trc$), then the system 100 is more easily operable to maintain a suitable temperature that: (a) keeps the fused powder 206 partially molten, so that the formed object is less likely to warp or deform; and (b) simultaneously, avoids partial melt of the remaining unfused powder, so that the remaining unfused powder is more easily separable from the formed object.

Figure 3:
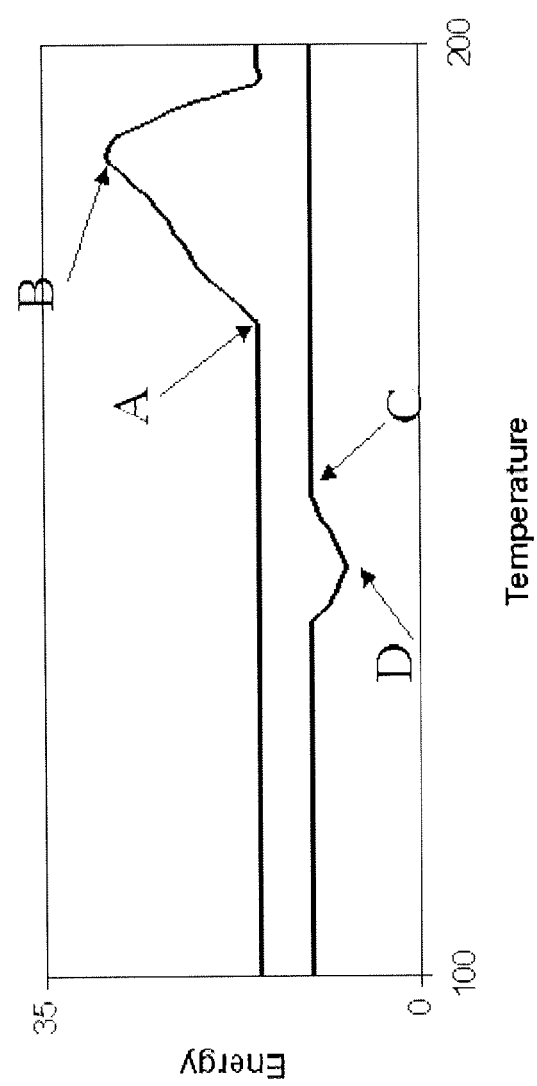
FIG. 3 is a first example differential scanning calorimetry ("DSC") trace of a first material, showing a melting curve and a recrystallization curve for the first material.

FIG. 3 is a first example DSC trace of a first powder, showing a melting curve and a recrystallization curve for the first powder. On the melting curve in FIG. 3, a point A marks a temperature at which onset of melting occurs for the first powder ("melting onset" or "Tmo"), and a point B marks a temperature at which melting energy peaks for the first powder ("melting peak" or "Tm"). On the recrystallization curve in FIG. 3, a point C marks a temperature at which onset of recrystallization occurs for the first powder ("recrystallization onset" or "Tro"), and a point D marks a temperature at which recrystallization energy peaks for the first powder ("recrystallization peak" or "Trc"). If the first powder has a relatively large positive difference between the point A and the point C, and a relatively large positive difference between the point B and the point D, then the first powder is relatively well-suited for use in the system 100.

Figure 4:
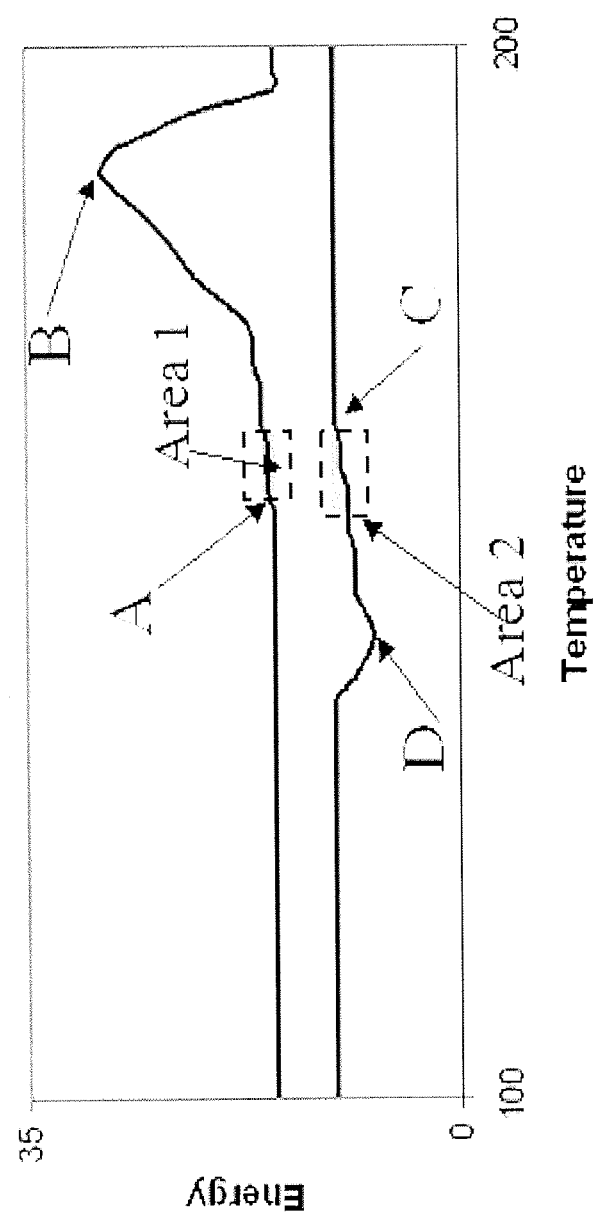
FIG. 4 is a second example DSC trace of a second material, showing a melting curve and a recrystallisation curve for the second material.

FIG. 4 is a second example DSC trace of a second powder, showing a melting curve and a recrystallization curve for the second powder. On the melting curve in FIG. 4, a point A marks the melting onset Tmo for the second powder, and a point B marks the melting peak Tm for the second powder. On the recrystallization curve in FIG. 4, a point C marks the recrystallization onset Tro for the second powder, and a point D marks the recrystallization peak Trc for the second powder.

The second powder includes multiple crystalline morphologies which tend to melt and recrystallize at temperatures that vary from one another on a material-by-material basis. In the example of FIG. 4, such variation causes a negative difference between the point A and the point C. Accordingly, FIG. 4 shows an area 1, which is a range of temperatures at which the second powder's melting overlaps with the second powder's recrystallization. Similarly, FIG. 4 shows an area 2, which is a range of temperatures at which the second powder's recrystallization overlaps with the second powder's melting. Often, such negative difference between the point A and the point C would make the second powder relatively unsuitable for use in the system 100. Nevertheless, if the area 1 and the area 2 are relatively small, then the second powder is potentially suitable for use in the system 100.

In some cases, a commercial sintering material has: (a) a first Tm ("Tm1") when the material is melted a first time; and (b) a second Tm ("Tm2"), which is lower than Tm1, when the material is melted a second (or subsequent) time. The system 100 is operable to heat such material at a temperature below Tm1, yet near Tm2, so that the formed object remains in a molten (or partially molten) state without melting the remaining unfused powder, because the formed object has already been melted a first time by the energy-directing mechanism 104.

At least one relatively good commercial sintering powder includes material that melts at a lower temperature than the bulk of such powder. If a powder includes material that melts at a lower temperature than the bulk of such powder, then: (a) such lower temperature is referenced as a melting onset ("Tmo"); and (b) if the difference between Trc and Tmo is too small, then such powder is relatively unsuitable for use in the system 100.

Preferably, a commercial sintering powder has: (a) a relatively large positive difference between its Tm and Trc; (b) a Tm2 that is lower than its Tm1; and (c) a relatively small difference between its Tmo and Tm, so that none of the powder melts prematurely (which would cause the remaining unfused powder to also partially melt and fuse together).

For SLS processing, EOS PA 2201 is a suitable dual melt point material. The material is available from EOS Gmbh of Germany. Also, 3D SYSTEMS, Inc, a US Corporation, supplies the material under the product name "DURAFORM PA". The material has at least two crystalline states. For example, if such material has not been previously melted, then a DSC of such material shows that: (a) its melt temperature ("first melting peak" or "Tm1") is normally ~186° C.; and (b) upon cooling, it recrystallizes at ~145° C. By comparison, if such material has been previously melted, then a DSC of such material shows that its melt temperature ("second melting peak" or "Tm2") has dropped to ~178° C. and its second melt peak onset temperature ("Tmo (2)") has dropped to ~172° C.

Examples of conventional SLS materials and their melting behaviors are shown in the following table:

| Material | First Melting Peak ("Tm1") | Second Melting Peak ("Tm2") | Recrystallization Peak ("Trc") | Melting Onset ("Tmo") | Recrystallization Onset ("Tro") |
|---|---|---|---|---|---|
| DURAFORM PA or EOS PA2200/2201 | 186° C. | 178° C. | 148° C. | 180° C. | 153° C. |
| ARKEMA ORGASOL 2003 | 182° C. | 178° C. | 149° C. | 172° C. | 153° C. |
| ARKEMA RILSAN D80 | 186° C. | 188° C. | 163° C. | 182° C. | 166° C. |

As can be seen from the table and confirmed by processing in the system 100, the Duraform PA, PA2200/PA2201 material is easier to successfully produce parts with. The Arkema Rilsan D80 is a relatively difficult material to process using the system 100. The temperature measurements presented in the table above were produced according to ASTM D3418-03 (Standard Test Method for Transition Temperatures and Enthalpies of Fusion and Crystallisation of Polymers by Differential Scanning calorimetry) with a TA Instruments TA Q10 DSC tool. For the evaluation of the Tm, the Trc, the onset points and the melt enthalpy (ΔHm), standard aluminum pans were used and the heating and cooling was performed as follows: (1) equilibrating at 40° C., (2) ramping at 10° C./min to 215° C., (3) holding isothermal for 5 minutes, (4) ramping at −10° C./min to 50° C., (5) holding isothermal for 1 minute, and then (6) ramping at 10° C./min to 250° C.

Semi-crystalline materials (e.g., polymers) may have various crystalline states that coexist with one another. The system 500 treats (e.g., by heating or annealing) polymers that form the powders or the powders themselves. FIG. 5-1. is a perspective view of an example of such a treatment system. Such treatment occurs at particular temperatures, pressures and durations. Such treatment modifies crystalline states for such polymers, which in turn improves their relative suitability for use in the system 100 (e.g., increases their temperature range of processability for SLS). In one example, such treatment changes a ratio of various crystalline states for such polymers, resulting in observable changes in melting and recrystallisation temperatures for such polymers.

In the system 500, a material source (501) is supplied. The material in inputted into a vessel 503 through a material transfer system 502 of the vessel, for example a pump, conveyor, or similar such device. The material enters the vessel 503 through an inlet 510. A heat transfer device (505) is then used to apply heat produced from a heat source 504 to the material in the vessel. Examples of such a heat source include, but are not limited to, heated oil and/or electrical heaters. Examples of a heat transfer device include, but are not limited to, an optional jacket around the vessel used to circulate a heated fluid (eg such as a gas or an oil) on the outside of the vessel and/or using heating elements, such as electrical heating elements, applied directly to the outside surface of the vessel. In one embodiment, the system 500 treats the material supplied from material source 501 at temperatures near such polymer's Tmo. At such temperatures, the system 500 may also keep such material in a fluidized state (e.g., agitated or stirred) using an agitator or stirring device 506, so that such material substantially avoids caking or sticking together if the material is a powder or similarly small grain sized material. Such agitation can take many forms, examples include, but are not limited to, fluidizing through pressurized gas flow from the gas source 508 or using a mechanical stirring or agitation device such as a mixer blade powered by power source 507. Also, such fluidization generally promotes a more uniform temperature distribution throughout a mass of such material being treated resulting in a more consistent final material output from the system 500. One embodiment of the system 500 may also provide for a gas inlet (509) into the vessel to provide from the gas source 508 either an inerting gas to prevent oxidation of the material and/or provide pressure in the vessel for the treatment. The system 500 also provides for a means of removing the treated material 513 from the vessel 503 through an outlet 511 and additional material transfer device 502. Optionally this material may be transferred to a material storage device 514, for example another vessel. The treatment process may be sufficiently automated and controlled through an attached control or computer device 512 managing any one or all of the following of time, temperature, pressure, agitation, gas flow, heat, and or material flow in or out of the treatment vessel.

Multiple embodiments of the system 500 and its use to produce relatively more suitable materials for use in the system 100 are possible. The system 500 may be configured to treat materials in multiple forms, such as pellets, flakes, and or powders of varying sizes. The treatment process may also be applied to the material in different stages of the process of preparing a powdered material for use in the system 100.

FIG. 5-2 shows an example of a process flowchart of using the system 500 in the preparation of a powder suitable for use by the system 100. In this process, a raw material 601 is provided. This raw material may be pellets, flakes, and or a powder of varying size. It may be advantageous to mix various additives 602 into the raw material 601 prior to treatment by commonly known practices of compounding or melt-mixing and extruding the raw materials 601 and additives 602 using a compounder and extruder other similar such device 603. This output compounded material 604 may be advantageous in the system 100 or similar such additive manufacturing processes utilising powders in that the material, when transformed into a usable powder form by process 605 and 606, may have the additives and or other raw materials mixed very homogenously compared to a conventional dry blending or mixing of the raw materials and additives together with a resulting better uniformity of physical or material property performance of parts produced by the system 100.

The output compounded material 604 may be powderised by a powderization device 605 before or after treatment by the system 500. Examples of such a powderization device 605 include, but are not limited to, such commonly practiced techniques as grinding or milling Such processes typically produce particles of irregular sizes and shapes that may optionally be rounded in step 606 through any number of commonly available particle rounding processes and/or sorted by particle size by common and well known methods such as mechanical sieving or air classification in step 607. Additional additives 609 or raw materials 610 in powder form or other form may be added by blending or other dry mixing methods in step 608 and at any point processes 605, 606, and/or 607 may be repeated either singly or in any combination. At any point, the powderized, shaped, sorted, and/or additionally mixed or blended may material may be sent for treatment to the system 500 for treatment. The output material 513 of the system 500 may be subjected to multiple repetitive treatments by the system 500, sent for powderisation or further compounding with additional additives or raw materials and or output for use by the system 100.

A further embodiment of the use of the system 500 is presented in FIG. 5-3. In this embodiment, the vessel 503 of FIG. 5-1 has been modified to a pipe 701. This pipe contains a material transfer mechanism 702, such as an auger or conveyor, that gradually moves powder down the length of the pipe. In this manner, the material stays in the pipe 701 for a length of treatment time governed by the speed of the transfer mechanism and the length of the pipe. The pipe 701 is heated as in the system 500 using a heat transfer mechanism 703 and a heat source 704. Power for the material transfer mechanism is provided via a power source 705 and provisions are made for material transfer devices into and out of the pipe. As in FIG. 5-1, the pipe vessel 701 may be supplied with gas from a gas source and the entire system controlled by a computer 512.

In another application of the system 500, the treated output material 513 is transferred into a storage vessel 800 shown in FIG. 5-4 using a material transfer device 502 through an inlet 810 into vessel 800. The storage vessel may be heavily insulated in order to maintain the treated output material at a relatively high temperature for long periods of time. The material may occasionally be transferred using a second material transfer device 502 through an outlet (811) in the vessel 800 into the system 500's heating vessel 503 to be reheated to a desired temperature. As in FIG. 5-1, the storage vessel 800 may be provided with a gas source (808) and a gas inlet (809) in order to maintain an inert atmosphere inside the vessel 800. The output from the system 800 vessel may at any time be transferred to further processes for powderization, sizing, shaping, additional mixing or blending of further raw materials or additives, and/or packaged for use in the system 100. The entire process may be optionally controlled by a computer 512.

In the manners above, the system 500 improves the powder's melting and recrystallisation temperatures by any combination of one or more of the following: (a) increasing a difference between the powder's Tm and Trc by increasing the powder's Tm; (b) increasing a difference between the powder's Tm and Trc by reducing the powder's Trc; (c) increasing a difference between the powder's Tm1 and Tm2; (d) increasing a difference between the powder's Tm1 and Trc; (e) increasing the powder's Tmo; and (f) reducing the powder's Tro. Accordingly, the illustrative embodiments: (a) make some powders more suitable for SLS processing (e.g., easier to process by SLS), even if such powders are already relatively suitable for SLS processing; and (b) make some powders relatively suitable for SLS processing, even if such powders are not already relatively suitable for SLS processing.

As a first example, in a closed vessel under nitrogen atmosphere, the system 500 pretreated a sample of ARKEMA ORGASOL lot 265 ("ORGASOL 2003 Sample") material, which is ARKEMA ORGASOL 2003 material. ARKEMA ORGASOL 2003 material is a nylon-12 powder available from ARKEMA Corporation of France. For SLS processing, ARKEMA ORGASOL 2003 material is relatively difficult to use, especially when compared to more commonly used material (e.g., EOS PA 2201, EOS PA 2200, 3D SYSTEMS Duraform PA). A large percentage of commercially available SLS powders include the EOS PA 2201, EOS PA 2200, and 3D SYSTEMS Duraform PA materials as a base polymer component.

Figure 6:
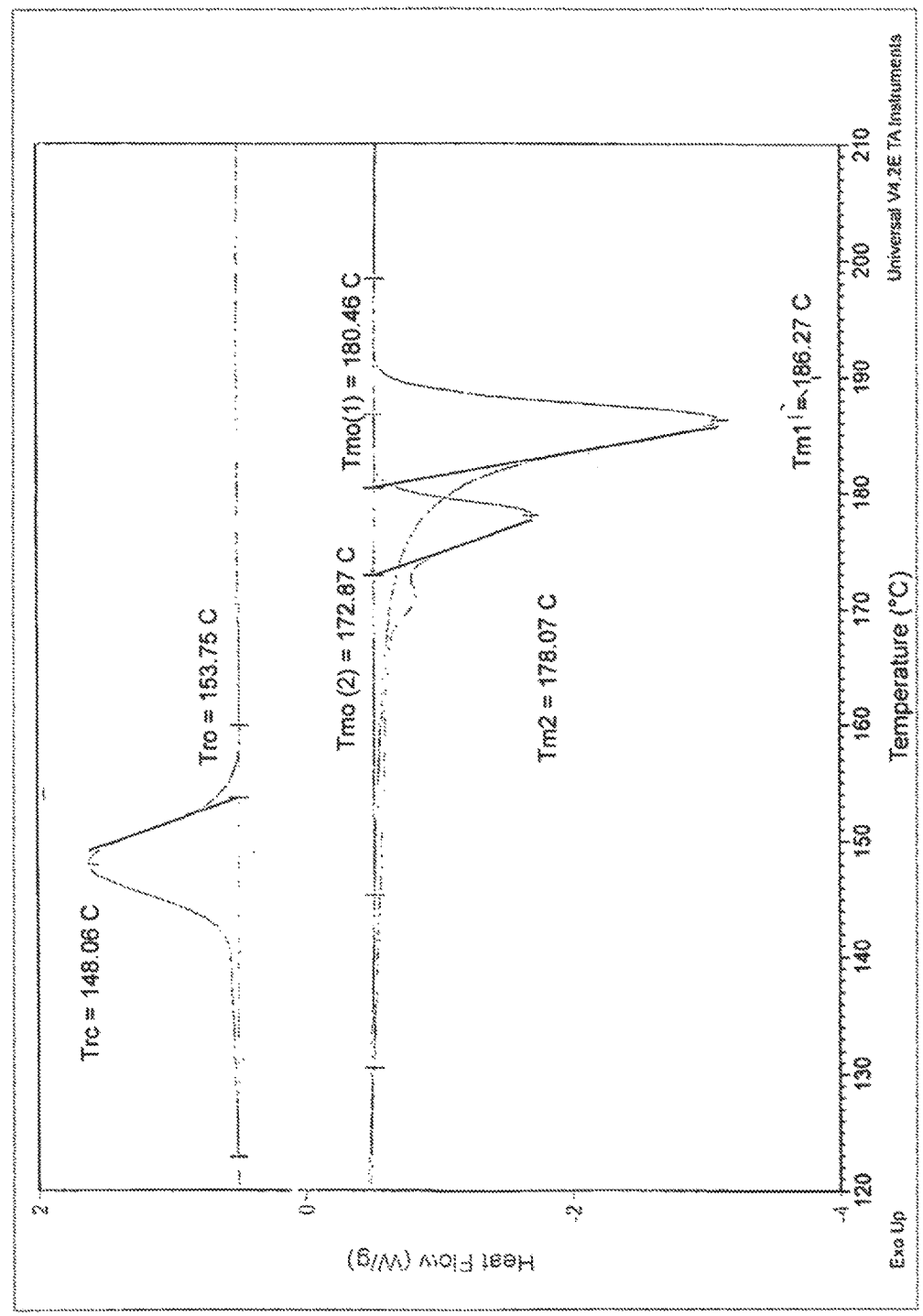
FIG. 6 is an example DSC trace of a sample of EVONIK nylon-12 material.

FIG. 6 is an example DSC trace of a sample of EOS PA2201 lot 919577 ("EOS PA2201 Sample") material. FIG. 6 is an example DSC trace of the ORGASOL 2003 Sample material. As shown in FIGS. 5 and 6, the EOS PA2201 Sample material has a melting peak Tm1 (FIG. 5) that is several degrees higher than a melting peak Tm1 (FIG. 7) of the competitive ORGASOL 2003 Sample material. The temperature measurements presented above were produced according to ASTM D3418-03 (Standard Test Method for Transition Temperatures and Enthalpies of Fusion and Crystallisation of Polymers by Differential Scanning calorimetry) with a TA Instruments TA Q10 DSC tool. For the evaluation of the Tm, the Trc, the onset points and the melt enthalpy (ΔHm), standard aluminum pans were used and the heating and cooling was performed as follows: (1) equilibrating at 50° C., (2) ramping at 10° C./min to 215° C., (3) holding isothermal for 5 minutes, (4) ramping at −10° C./min to 50° C., (5) holding isothermal for 1 minute, and then (6) ramping at 10° C./min to 250° C.

Figure 7:
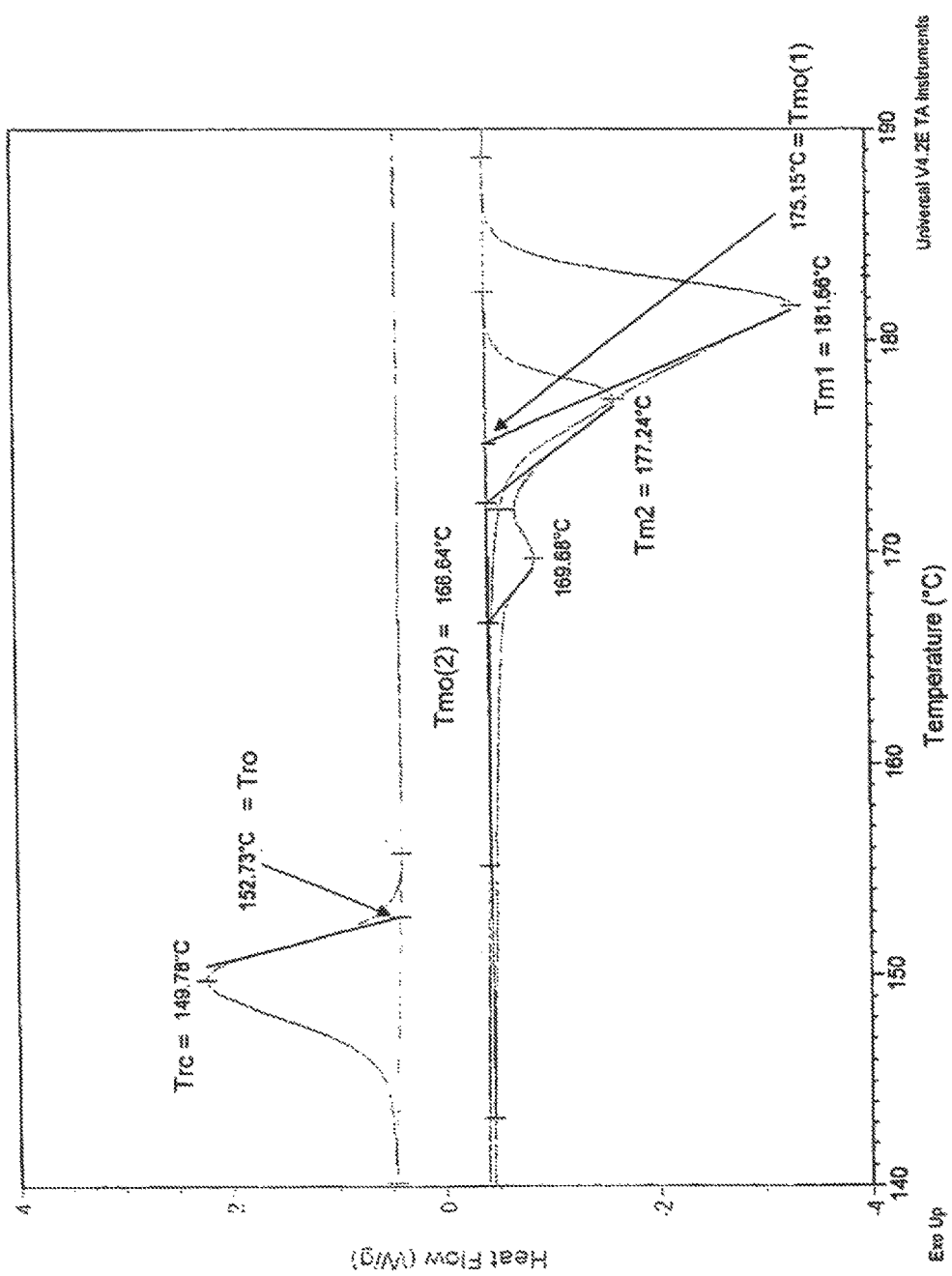
FIG. 7 is an example DSC trace of a sample of ARKEMA ORGASOL 2003 nylon-12 material.
Figure 8:
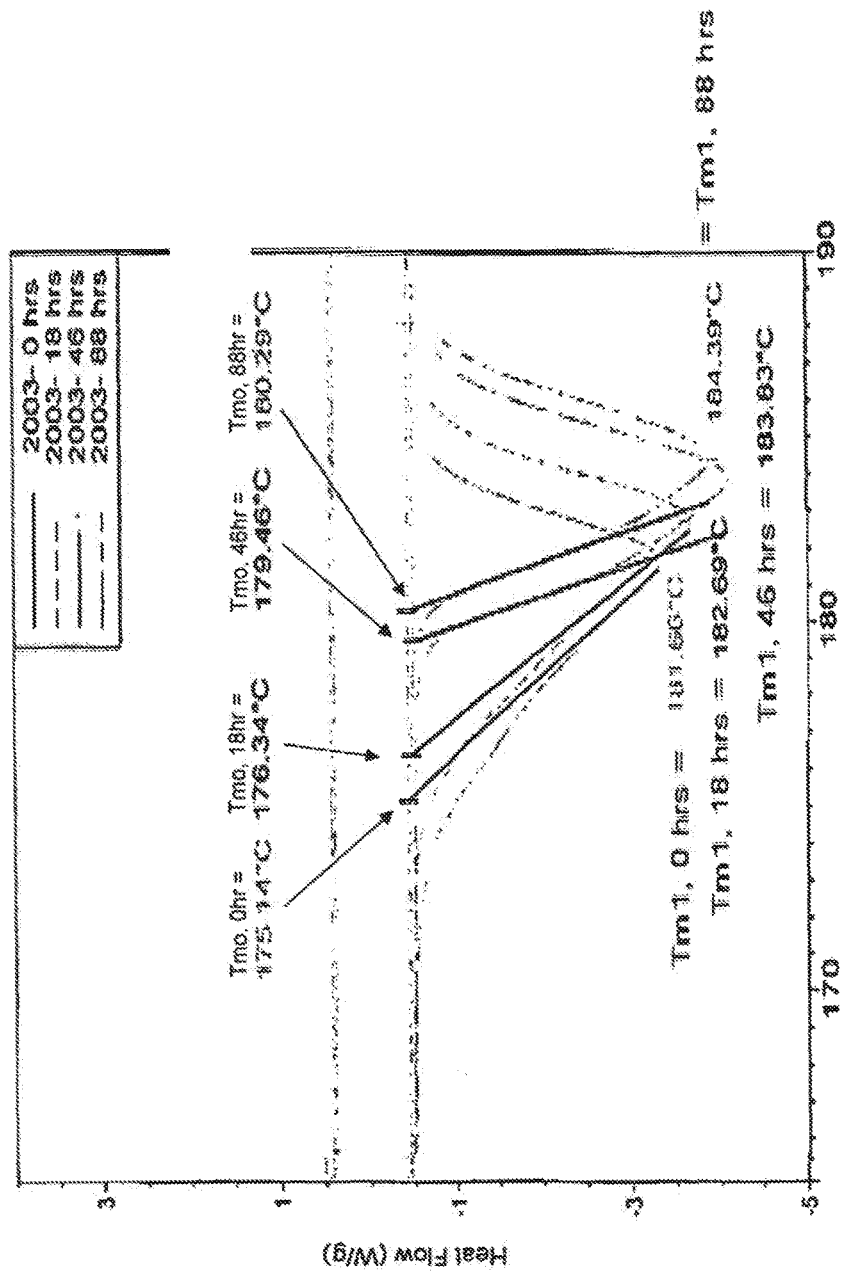
FIG. 8 is an example DSC trace of the material of FIG. 7 after treating according to a first version of the illustrative embodiments.

FIG. 8 is an example DSC trace of the ORGASOL 2003 Sample material, after such material was pretreated with heat ("heat treated") for durations varying between 18 hours and 88 hours by the system 500 at 166° C.-168° C. in a closed vessel under nitrogen atmosphere. Such pretreatment improved the ORGASOL 2003 Sample material's temperature range of processability for SLS, as shown in FIG. 7 and the following table. The temperature measurements presented above were produced according to ASTM D3418-03 (Standard Test Method for Transition Temperatures and Enthalpies of Fusion and Crystallization of Polymers by Differential Scanning calorimetry) with a TA Instruments TA Q10 DSC tool. For the evaluation of the Tm, the Trc, the onset points and the melt enthalpy (ΔHm), standard aluminum pans were used and the heating and cooling was performed as follows: (1) equilibrating at 50° C., (2) ramping at 10° C./min to 215° C., (3) holding isothermal for 5 minutes, (4) ramping at −10° C./min to 50° C., (5) holding isothermal for 1 minute, and then (6) ramping at 10° C./min to 250° C.

| Sample | Melting Peak ("Tm1") | Melting Onset ("Tmo") | Recrystallization Peak ("Trc") | Recrystallization Onset ("Tro") |
|---|---|---|---|---|
| EOS PA2201 Lot 919577 | 186.27° C. | 180.46° C. | 148.06° C. | 153.75° C. |

-continued

| Sample | Melting Peak ("Tm1") | Melting Onset ("Tmo") | Recrystallization Peak ("Trc") | Recrystallization Onset ("Tro") |
|---|---|---|---|---|
| ARKEMA ORGASOL 2003 control sample (non-pretreated) | 181.66° C. | 175.14° C. | 149.78° C. | 152.74° C. |
| ARKEMA ORGASOL 2003 pretreated sample (heat treated 88 hours at 166° C.-168° C.) | 184.39° C. | 180.29° C. | 152.03° C. | 154.55° C. |

As shown in FIG. 8 and the table above, such pretreatment of the ORGASOL 2003 Sample material causes its melting behavior to approach the EOS PA2201 Sample material's melting behavior, so that such pretreated ORGASOL 2003 Sample material is more suitable for SLS processing. FIG. 9 is an example DSC trace of the ORGASOL 2003 Sample material, the pretreated ORGASOL 2003 Sample material, and the EOS PA2201 Sample material, in comparison to one another. As shown in FIG. 9, the pretreated ORGASOL 2003 Sample material's first melting peak Tm1 is 184.39° C., which is substantially higher than the non-pretreated ORGASOL 2003 Sample material's first melting peak Tm1 of 181.66° C. The temperature measurements presented above were produced according to ASTM D3418-03 (Standard Test Method for Transition Temperatures and Enthalpies of Fusion and Crystallisation of Polymers by Differential Scanning calorimetry) with a TA Instruments TA Q10 DSC tool. For the evaluation of the Tm, the Trc, the onset points and the melt enthalpy (ΔHm), standard aluminum pans were used and the heating and cooling was performed as follows: (1) equilibrating at 50° C., (2) ramping at 10° C./min to 215° C., (3) holding isothermal for 5 minutes, (4) ramping at −10° C./min to 50° C., (5) holding isothermal for 1 minute, and then (6) ramping at 10° C./min to 250° C.

Furthermore, in comparison to the EOS PA2201 Sample material, such pretreated ORGASOL 2003 Sample material appears to have an additional advantage in the shape of its melting curve. For example, during formation of an object with the EOS PA2201 Sample material, the system 100 maintains a temperature of ~178° C. for the bed of powder 208. As shown in FIG. 9, a percentage of the EOS PA2201 Sample material that melted at 178° C. is represented by a shaded area within such material's melting curve for temperatures ranging up to 178° C. Such area indicates that, in comparison to the pretreated ORGASOL 2003 Sample material: (a) a higher percentage of the EOS PA2201 Sample material is molten at 178° C.; and (b) accordingly, after the object's entire shape is formed by the system 100 with the EOS PA2201 Sample material, the remaining unfused EOS PA2201 Sample material's powder would be relatively more difficult to separate from the object. As can also be seen by the FIG. 9, a substantially smaller percentage of the treated ORGASOL 2003 material is melted at the temperature of ~178° C. than for the un-treated ORGASOL 2003 material providing a substantially improved ability to remove unfused material from objects produced by the system 100.

FIG. 10 is an example DSC trace of the ORGASOL 2003 Sample material, after such material was heat treated for 88 hours by the system 500. Such treated ORGASOL 2003 Sample material's second melting curve in FIG. 10 is substantially unchanged in comparison to the example DSC trace of the non-pretreated ORGASOL 2003 Sample material in FIG. 7. Furthermore, its recrystallisation temperature is also substantially unchanged. However, said sample material's first melting curve is substantially changed by the treatment method of the system 500 including substantially increased first melting peak temperatures and first melting onset temperatures. In a test of suitability for SLS processing, a DTM 2500 PLUS laser sintering machine version of the system 100 formed: (a) a first object with a batch of the ORGASOL 2003 material treated by the system 500; (b) a second object with a batch of the non-pretreated ORGASOL 2003 Sample material. Such batches were relatively small, and such objects included warpage bars (which were formed at a length of 12 inches on the front of each object). The remaining unfused powder (e.g., within the bed of powder 208 on the part bed 102) that existed during formation of the first object: (a) was substantially softer (e.g., less caking) than the remaining unfused powder that existed during formation of the second object; and (b) in terms of softness, was approximately the same as the remaining unfused powder that existed during formation of the third object. Moreover, the first object's warpage bars showed substantially less warpage than the second object's warpage bars, which is a factor to be considered in commercial use of such materials. The temperature measurements presented above were produced according to ASTM D3418-03 (Standard Test Method for Transition Temperatures and Enthalpies of Fusion and Crystallization of Polymers by Differential Scanning calorimetry) with a TA Instruments TA Q10 DSC tool. For the evaluation of the Tm, the Trc, the onset points and the melt enthalpy (ΔHm), standard aluminum pans were used and the heating and cooling was performed as follows: (1) equilibrating at 50° C., (2) ramping at 10° C./min to 215° C., (3) holding isothermal for 5 minutes, (4) ramping at −10° C./min to 50° C., (5) holding isothermal for 1 minute, and then (6) ramping at 10° C./min to 250° C.

FIG. 11 is an example DSC trace of the pretreated ORGASOL 2003 Sample material of FIG. 10, after such material was heat treated for an additional 87 hours by the system 100 at 167° C.-168° C. in a closed vessel under nitrogen atmosphere, so that such material was heat treated for a total of 175 hours (i.e., 88 hours in the example of FIG. 10, plus the additional 87 hours in the example of FIG. 11). As shown in FIG. 11, such pretreatment caused: (a) an increase to 185.23° C. in such material's first melting peak Tm1; and (b) a relatively large increase to 183.77° C. in such material's melting onset Tmo. The temperature measurements presented above were produced according to ASTM D3418-03 (Standard Test Method for Transition Temperatures and Enthalpies of Fusion and Crystallization of Polymers by Differential Scanning calorimetry) with a TA Instruments TA Q10 DSC tool. For the evaluation of the Tm, the Trc, the onset points and the melt enthalpy (ΔHm), standard aluminum pans were used and the heating and cooling was performed as follows: (1) equilibrating at 50° C., (2) ramping at 10° C./min to 215° C., (3) holding isothermal for 5 minutes, (4) ramping at −10° C./min to 50° C., (5) holding isothermal for 1 minute, and then (6) ramping at 10° C./min to 250° C.

FIG. 12 is an example DSC trace of the ORGASOL 2003 Lot 059 Sample material, after such material was heat treated for 60 hours by the system 500 at 171° C. in a closed vessel under nitrogen atmosphere at a pressure of 3,000 psi, which is substantially higher than atmospheric pressure at sea level (e.g., 3,000 psi is more than two orders of magnitude higher than atmospheric pressure at sea level). FIG. 12 shows a DSC plot of treated material compared to two reference runs of un-treated material. As shown in FIG. 12, such treatment caused: (a) an increase of approximately 1° C. in such material's first melting peak Tm1; and (b) an increase of approximately 1.5° C. in such material's melting onset Tmo. The temperature measurements presented above were produced according to ASTM D3418-03 (Standard Test Method for Transition Temperatures and Enthalpies of Fusion and Crystallization of Polymers by Differential Scanning calorimetry) with a TA Instruments TA Q10 DSC tool. For the evaluation of the Tm, the Trc, the onset points and the melt enthalpy (ΔHm), standard aluminum pans were used and the heating and cooling was performed as follows: (1) equilibrating at 50° C., (2) ramping at 10° C./min to 215° C., (3) holding isothermal for 5 minutes, (4) ramping at −10° C./min to 50° C., (5) holding isothermal for 1 minute, and then (6) ramping at 10° C./min to 250° C.

FIG. 13 is a first example DSC trace of a sample of ARKEMA ORGASOL lot 059 material (which is ARKEMA ORGASOL 2003 material), after such material was heat treated by the system 500 in a closed vessel under nitrogen atmosphere in three stages, namely: (a) a first stage in which such material was annealed for 24 hours by the system 500 at 171° C.; (b) a second stage in which such material was annealed for an additional 24 hours by the system 500 at 175° C.; and (c) a third stage in which such material was annealed for yet another 24 hours by the system 500 at 177° C. The temperature measurements presented above were produced according to ASTM D3418-03 (Standard Test Method for Transition Temperatures and Enthalpies of Fusion and Crystallisation of Polymers by Differential Scanning calorimetry) with a TA Instruments TA Q10 DSC tool. For the evaluation of the Tm, the Trc, the onset points and the melt enthalpy (ΔHm), standard aluminum pans were used and the heating and cooling was performed as follows: (1) equilibrating at 50° C., (2) ramping at 10° C./min to 215° C., (3) holding isothermal for 5 minutes, (4) ramping at −10° C./min to 50° C., (5) holding isothermal for 1 minute, and then (6) ramping at 10° C./min to 250° C.

In heat treating a powdered material, the system 500 gradually increases such material's temperature as it approaches such material's melting onset Tmo. In that manner, such material is: (a) less likely to agglomerate during the heat treating; and (b) more likely to flow within the heat treating vessel. By maintaining relatively good physical flow properties within the heat treating vessel, such powdered material is more easily: (a) removed from the heat treating vessel, so that such material is more readily available for subsequent SLS processing by the system 100; and (b) stirred within the heat treating vessel, so that a more uniform temperature distribution is generally promoted throughout a mass of such material.

As shown in the following table, a representative material's melting peak Tm1 and its melting onset Tmo increase correspondingly with each 24-hour heat treatment.

| Time and temperature | Melting Peak ("Tm1") | Melting Onset ("Tmo") |
|---|---|---|
| Control Sample, non-pretreated | 181.33° C. | 173.45° C. |
| Heat treated, 24 hours at 171° C. | 182.04° C. | 175.71° C. |
| Heat treated, additional 24 hours at 175° C. (total 48 hours) | 182.42° C. | 178.35° C. |
| Heat treated, yet another 24 hours at 177° C. (total 72 hours) | 182.87° C. | 179.91° C. |

FIG. 14 is an example DSC trace of a sample of ARKEMA ORGASOL lot 2110355 ("ORGASOL 2002 Sample") material, which is ARKEMA ORGASOL 2002 material. ARKEMA ORGASOL 2002 material is a coating nylon-12 powder available from ARKEMA Corporation of France. As shown in FIG. 14, such material's first and second melting peaks Tm1 and Tm2 are effectively the same. Accordingly, such material has a relatively small temperature range of processability for SLS by the system 100. Nevertheless, such material has been available in relatively large volumes at relatively low cost, especially in comparison to ARKEMA ORGASOL 2003 material and other specialty materials. The temperature measurements presented above were produced according to ASTM D3418-03 (Standard Test Method for Transition Temperatures and Enthalpies of Fusion and Crystallization of Polymers by Differential Scanning calorimetry) with a TA Instruments TA Q10 DSC tool. For the evaluation of the Tm, the Trc, the onset points and the melt enthalpy (ΔHm), standard aluminum pans were used and the heating and cooling was performed as follows: (1) equilibrating at 50° C., (2) ramping at 10° C./min to 215° C., (3) holding isothermal for 5 minutes, (4) ramping at −10° C./min to 50° C., (5) holding isothermal for 1 minute, and then (6) ramping at 10° C./min to 250° C.

FIG. 15 is an example DSC trace of the ORGASOL 2002 Sample material, after such material was heat treated for durations varying between 18 hours and 88 hours by the system 500 at 166° C.-168° C. in a closed vessel under nitrogen atmosphere. Such pretreatment improved the ORGASOL 2002 Sample material's temperature range of processability for SLS, as shown in FIG. 15 and the following table. The temperature measurements presented above were produced according to ASTM D3418-03 (Standard Test Method for Transition Temperatures and Enthalpies of Fusion and Crystallisation of Polymers by Differential Scanning calorimetry) with a TA Instruments TA Q10 DSC tool. For the evaluation of the Tm, the Trc, the onset points and the melt enthalpy (ΔHm), standard aluminum pans were used and the heating and cooling was performed as follows: (1) equilibrating at 50° C., (2) ramping at 10° C./min to 215° C., (3) holding isothermal for 5 minutes, (4) ramping at −10° C./min to 50° C., (5) holding isothermal for 1 minute, and then (6) ramping at 10° C./min to 250° C.

| Sample | Melting Peak ("Tm1") | Melting Onset ("Tmo") | Recrystallization Peak ("Trc") | Recrystallization Onset ("Tro") |
|---|---|---|---|---|
| ORGASOL 2002 - Control Sample, non-pretreated | 177.82° C. | 173.64° C. | 150.58° C. | 153.34° C. |
| ORGASOL 2002, heat treated 18 hours at 166° C.-168° C. | 180.00° C. | 175.19° C. | 151.02° C. | 153.65° C. |
| ORGASOL 2002, heat treated 46 hours at 166° C.-168° C. | 180.73° C. | 177.33° C. | 150.95° C. | 153.57° C. |
| ORGASOL 2002, heat treated 88 hours at 166° C.-168° C. | 180.05° C. & 183.53° C. | 178.67° C. | 150.56° C. | 153.45° C. |

FIG. 16 is an example DSC trace of the ORGASOL 2002 Sample material, after such material was heat treated for 88 hours by the system 500 at 167° C.-168° C. in a closed vessel under nitrogen atmosphere. As shown in FIG. 16, such pretreatment caused: (a) an increase in such material's first melting peak Tm1; and (b) a relatively large increase in a difference between such material's first melting peak Tm1 and its second melting peak Tm2. Further, as shown in FIG. 16, such material's first melting peak Tm1 includes two peaks, namely: (a) a first peak at −180° C.; and (b) a second higher peak at 183.53° C. To at least some extent, the application of more treatment time by the system 500 would continue to gradually move the lower peak towards the higher peak and the higher peak to a greater temperature overall peak. The temperature measurements presented above were produced according to ASTM D3418-03 (Standard Test Method for Transition Temperatures and Enthalpies of Fusion and Crystallisation of Polymers by Differential Scanning calorimetry) with a TA Instruments TA Q10 DSC tool. For the evaluation of the Tm, the Trc, the onset points and the melt enthalpy (ΔHm), standard aluminum pans were used and the heating and cooling was performed as follows: (1) equilibrating at 50° C., (2) ramping at 10° C./min to 215° C., (3) holding isothermal for 5 minutes, (4) ramping at −10° C./min to 50° C., (5) holding isothermal for 1 minute, and then (6) ramping at 10° C./min to 250° C.

FIG. 17 is an example DSC trace of FARSOON PA3 material, which is a nylon powder available from HUNAN FARSOON COMPANY of China. Such material was heat treated by the system 500 at 171° C. in a closed vessel under nitrogen atmosphere in two cases, namely: (a) a first case in which a first sample of such material was heat treated for 24 hours by the system 100; and (b) a second case in which a second sample of such material was heat treated for 72 hours by the system 500. Such pretreatment improved the FARSOON PA3 material's temperature range of processability for SLS, as shown in FIG. 17 and the following table. The temperature measurements presented above were produced according to ASTM D3418-03 (Standard Test Method for Transition Temperatures and Enthalpies of Fusion and Crystallisation of Polymers by Differential Scanning calorimetry) with a TA Instruments TA Q10 DSC tool. For the evaluation of the Tm, the Trc, the onset points and the melt enthalpy (ΔHm), standard aluminum pans were used and the heating and cooling was performed as follows: (1) equilibrating at 50° C., (2) ramping at 10° C./min to 230° C., (3) holding isothermal for 5 minutes, (4) ramping at −10° C./min to 50° C., (5) holding isothermal for 1 minute, and then (6) ramping at 10° C./min to 230° C.

| Sample | Melting Peak ("Tm1") | Melting Onset ("Tmo") | Recrystallization Peak ("Trc") | Recrystallization Onset ("Tro") |
|---|---|---|---|---|
| FARSOON PA3 | 188.26° C. | 180.82° C. | 154.38° C. | 159.31° C. |
| FARSOON PA3, heat treated 24 hours at 171° C. | 190.87° C. | 182.70° C. | 143.69° C. | 151.37° C. |
| FARSOON PA3, heat treated 72 hours at 171° C. | 191.82° C. | 184.48° C. | 142.28° C. | 150.02° C. |

Some laser sintering machines have relatively precise requirements for powdered material that is processed by such machines. For example, some laser sintering machines are sensitive to relatively small variations in such material's melting behavior (and/or relatively small variations in temperature). By suitably heat treating such material before SLS processing with the system 500, the illustrative embodiments are operable to: (a) correct batch-to-batch variations in such material from suppliers; and (b) in that manner, improve consistency of such material's melting behavior for achieving higher quality control and repeatability in SLS processing with the system 500.

In a further embodiment, a nylon-46 material (PA46 supplied by DSM) was treated by the system 500. PA46 is particularly useful for sintering due to its substantially higher melting point compared to other nylons, thus, allowing the system 100 to make parts that can be used in higher temperature operating environments. FIG. 18 shows an example DSC trace of the PA46 material before and after treatment. In this example, the PA46 was treated for 15 hours by the system 500 at 280° C. in a closed vessel under a nitrogen atmosphere. As can be seen from FIG. 18, the treatment had a substantial impact on the first melting point of the material, increasing the first melting peak from 288.78° C. to 319.29° C., an increase of over 30° C. Furthermore, the first melt onset increased even more, from 280.27° C. to 313.42° C., an increase of over 33° C. The recrystallization temperature also decreased, increasing the difference between the melting peak and the recrystallization peak. In FIG. 18. the recrystallization temperature decreased from 254.98° C. to 246.69° C., further improving the processing window of the material in the system 100. The treatment by the system 500 shows a substantial increase in the processability of the material by the system 100. The temperature measurements presented above were produced according to ASTM D3418-03 (Standard Test Method for Transition Temperatures and Enthalpies of Fusion and Crystallisation of Polymers by Differential Scanning calorimetry) with a TA Instruments TA Q10 DSC tool. For the evaluation of the Tm, the Trc, the onset points and the melt enthalpy (ΔHm), standard aluminum pans were used and the heating and cooling was performed as follows: (1) equilibrating at 50° C., (2) ramping at 20° C./min to 350° C., (3) holding isothermal for 5 minutes, (4) ramping at −20° C./min to 50° C., (5) holding isothermal for 1 minute, and then (6) ramping at 20° C./min to 350°.

In a further embodiment, a nylon-6 material (supplied by Nylotek) was treated by the system 500. FIG. 19 shows an example DSC trace of the PA6 material before and after treatment. In this example, the PA66 was treated for 24 hours by the system 500 at 212° C. in a closed vessel under a nitrogen atmosphere. As can be seen from the FIG. 19, the treatment by the system 500 substantially narrowed the first melting curve of the material. In this example, the melting onset temperature shifted from 209.3° C. to 217.08° C. This substantially increased melting onset temperature improves the ease of use of the material in the system 100. The temperature measurements presented above were produced according to ASTM D3418-03 (Standard Test Method for Transition Temperatures and Enthalpies of Fusion and Crystallisation of Polymers by Differential Scanning calorimetry) with a TA Instruments TA Q10 DSC tool. For the evaluation of the Tm, the Trc, the onset points and the melt enthalpy (ΔHm), standard aluminum pans were used and the heating and cooling was performed as follows: (1) equilibrating at 50° C., (2) ramping at 10° C./min to 250° C., (3) holding isothermal for 5 minutes, (4) ramping at −10°

C./min to 50° C., (5) holding isothermal for 1 minute, and then (6) ramping at 10° C./min to 250°.

A further nylon-6 material sample was tested using the treatment method of the system 500. This nylon-6 material was produced by Arkema corporation as ES 1002. A sample of this material was treated by the system 500 for a period of 24 hours at 200° C. under nitrogen. FIG. 20 shows a DSC trace of the untreated and treated material. As can be seen from FIG. 20, the melting peak Tm1 of the treated material has clearly shifted up approximately one degree celsius. Furthermore, the melting curve of the treated sample has narrowed considerably compared to the melting curve of the untreated reference sample. The temperature measurements presented above were produced according to ASTM D3418-03 (Standard Test Method for Transition Temperatures and Enthalpies of Fusion and Crystallization of Polymers by Differential Scanning calorimetry) with a TA Instruments TA Q10 DSC tool. For the evaluation of the Tm, the Trc, the onset points and the melt enthalpy ($\Delta$Hm), standard aluminum pans were used and the heating and cooling was performed as follows: (1) equilibrating at 50° C., (2) ramping at 10° C./min to 250° C., (3) holding isothermal for 5 minutes, (4) ramping at −10° C./min to 50° C., (5) holding isothermal for 1 minute, and then (6) ramping at 10° C./min to 250°.

The method of using the system 500 to treat materials for use in the system 100 process was further applied to material samples of polypropylene. In the first example, a sample of polypropylene powder, Polypropylene A (trade name Propyltex 200S) was treated by the system 500 for 24 hours at 145° C. under nitrogen. As can be seen by the DSC trace shown in FIG. 21, the treated sample showed a noticeable increase in the first melting peak, increasing from 157.84° C. to 159.31° C. The first melting curve narrowed substantially as reflected by the increase in the melting onset point from 147.13° C. to 152.92° C. The recrystallisation temperatures remained substantially unchanged. The temperature measurements presented above were produced according to ASTM D3418-03 (Standard Test Method for Transition Temperatures and Enthalpies of Fusion and Crystallisation of Polymers by Differential Scanning calorimetry) with a TA Instruments TA Q10 DSC tool. For the evaluation of the Tm, the Trc, the onset points and the melt enthalpy ($\Delta$Hm), standard aluminum pans were used and the heating and cooling was performed as follows: (1) equilibrating at 50° C., (2) ramping at 10° C./min to 192° C., (3) holding isothermal for 5 minutes, (4) ramping at −10° C./min to 50° C., (5) holding isothermal for 1 minute, and then (6) ramping at 10° C./min to 192°.

A second example of polypropylene polymer powder, Polypropylene "B", was acquired from Trial Corporation of Japan and treated by the system 500. FIG. 22 shows a DSC trace of the treated sample compared to the untreated sample. As was the case with Polypropylene "A", the system 500, using a temperature of 115° C. for 24 hours under nitrogen, produced a noticeable improvement in the processing characteristics of the material for the system 100 increasing the melting peak temperature by approximately 3 degrees Celsius and the melting onset temperature improved by almost 8 degrees Celsius. The temperature measurements presented above were produced according to ASTM D3418-03 (Standard Test Method for Transition Temperatures and Enthalpies of Fusion and Crystallization of Polymers by Differential Scanning calorimetry) with a TA Instruments TA Q10 DSC tool. For the evaluation of the Tm, the Trc, the onset points and the melt enthalpy ($\Delta$Hm), standard aluminum pans were used and the heating and cooling was performed as follows: (1) equilibrating at 50° C., (2) ramping at 10° C./min to 155° C., (3) holding isothermal for 5 minutes, (4) ramping at −10° C./min to 50° C., (5) holding isothermal for 1 minute, and then (6) ramping at 10° C./min to 155°

The method of the system 500 was further practiced on a sample of polyethylene material, Petrothene PE HDBM. The material sample was treated by the system 500 for a period 24 hours at 118° C. under nitrogen. FIG. 23 shows a DSC trace of the treated sample compared to the untreated sample. The treatment process of the system 500 resulted in an increase of the first melting peak by approximately 2 degrees Celsius and an increase in the melting onset temperature by almost 3 degrees Celsius compared to the untreated control sample. The temperature measurements presented above were produced according to ASTM D3418-03 (Standard Test Method for Transition Temperatures and Enthalpies of Fusion and Crystallization of Polymers by Differential Scanning calorimetry) with a TA Instruments TA Q10 DSC tool. For the evaluation of the Tm, the Trc, the onset points and the melt enthalpy ($\Delta$Hm), standard aluminum pans were used and the heating and cooling was performed as follows: (1) equilibrating at 50° C., (2) ramping at 10° C./min to 180° C., (3) holding isothermal for 5 minutes, (4) ramping at −10° C./min to 50° C., (5) holding isothermal for 1 minute, and then (6) ramping at 10° C./min to 180°

The method of the system 500 was further practiced on a sample of polyamide ter-polymer, Platimid M1757. The material is a ter-polymer of polyamide 6, polyamide 66, polyamide 12.

The material sample was treated by the system 500 for periods of 4 hours, 8 hours, 12 hours, and 16 hours at 94° C. under nitrogen. FIG. 24 shows a DSC traces of the treated samples compared to the untreated sample. The DSC traces were generated according to ASTM D3418-03 (Standard Test Method for Transition Temperatures and Enthalpies of Fusion and Crystallization of Polymers by Differential Scanning calorimetry) with a TA Instruments TA Q10 DSC tool. For the evaluation of the Tm, the Trc, the onset points and the melt enthalpy ($\Delta$Hm), standard aluminum pans were used and the heating and cooling was performed as follows: (1) equilibrating at 40° C., (2) ramping at 10° C./min to 135° C., (3) holding isothermal for 1 minute, (4) ramping at −10° C./min to 40° C., (5) holding isothermal for 1 minute, and then (6) ramping at 10° C./min to 135°.

The treatment process is particularly advantageous for using the material in the system 100. The untreated ter-polymer has a very broad melting curve and it is difficult to find a specified temperature for the system 100 to operate at during object formation. For example, if the system 100 maintains a temperature that is too low for the material in the bed of powder 208, then the fused powder 206 may return to a solid state (or "recrystallize") too quickly, which may cause the formed object to warp or deform. However, if the system 100 maintains a temperature that is too high for the bed of powder 208 (e.g., too near such powder's melting point), then the remaining unfused powder may partially melt, which may increase the relative difficulty of separating the remaining unfused powder from the formed object. In the case of the Platimid M1757, prior to treatment by the system 500, substantial percentages of the bed of powder are partially molten at the temperature required by the system 100 to form non-warped objects. As can be seen by the DSC traces, the effect of the treatment by the system 500 is to substantially narrow the melting curve allowing the system 100 to operate at temperatures where the bed of powder 208 remains substantially uncaked. FIG. 25 clearly demonstrates that at a system 100 operating temperature of 100° C. the untreated material would have a substantial molten fraction (represented by the shaded area under the DSC trace). In the cases of all the treated samples, the fraction of melted material in the bed of powder 208 is negligible thus allowing for easier operation of the system 100.

The diagrams in the Figures illustrate the architecture, functionality, and operation of possible implementations of systems and methods according to the illustrative embodiments. In some alternative implementations, the operations noted in the block may occur out of the order noted in the Figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the inventions. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the inventions in the form disclosed. Many modifications and variations will be apparent to those of ordinary skill in the art without departing from the scope and spirit of the inventions. The embodiment was chosen and described to explain the principles of the inventions and the practical application, and to enable others of ordinary skill in the art to understand the inventions for various embodiments with various modifications as are suited to the particular use contemplated.

What is claimed is:

1. A material in powdered form for additive manufacturing having a narrowed melting curve relative to untreated material, the material comprising: at least one thermoplastic polymer with preexisting crystalline states that has been treated after polymerization by heat under inert gas, starting at a specified temperature, to modify at least one of melting temperature (Tm), recrystallization temperature (Trc) and melt enthalpy (ΔHm),
   wherein the treatment temperature is not more than 30 degrees C. lower, not more than 20 degrees C. lower, or not more than 10 degrees C. lower than the melting temperature (Tm) of the untreated material; and
   wherein the heat treatment time is at least one hour, optionally, at least ten hours, or at least fifteen hours.

2. The material of claim 1, wherein the inert gas atmosphere is nitrogen.

3. The material of claim 1, wherein the at least one thermoplastic polymer has been treated by heat in an inert atmosphere at a specified pressure, wherein the specified pressure is higher than atmospheric pressure at sea level.

4. The material of claim 1, wherein the specified temperature is near a melting onset.

5. The material of claim 1, wherein the at least one thermoplastic polymer has been treated with heat at the specified temperature by gradually increasing the at least one polymer's temperature as it approaches the melting onset.

6. The material of claim 1, wherein the at least one thermoplastic polymer has been treated by heat while it was kept in a fluidized state.

7. The material of claim 1, wherein the at least one thermoplastic polymer has been treated by heat at least twice, including at least: a first time at a first specified temperature for a first specified duration; and a second time at a second specified temperature for a second specified duration.

8. The material of claim 1, wherein the at least one thermoplastic polymer has been treated by heat to increase a difference between the onset melting temperature and the onset recrystallization temperature.

9. The material of claim 1, wherein the melting temperature (Tm) is a first melting temperature when the at least one thermoplastic polymer is melted a first time, wherein the melting temperature is a second melting temperature when the at least one thermoplastic polymer is melted a second time, and wherein the at least one thermoplastic polymer has been treated by heat to increase a difference between the first melting temperature and the second melting temperature.

10. The material of claim 1, wherein the at least one thermoplastic polymer is a semi crystalline thermoplastic polymer.

11. The material according to claim 1, wherein the thermoplastic polymer or copolymer is selected from polyamide (PA), polyaryletherketone (PAEK), Polyarylethersulfone (PAES), polyester, polyether, polyolefine, polystyrene, polyphenylenesulfide, polyvinylidenfluoride, polyphenylenoxid, polyimide and copolymers or blends comprising at least one of the aforementioned polymers.

12. The material according to claim 1, wherein the thermoplastic polymer or copolymer is a polyamide or semi aromatic Polyamides, respectively, selected from Polyamide 6, Polyamide 11, Polyamide 12, Polyamide 46, Polyamide 66, Polyamide 1010, Polyamide 1012, Polyamide 1112, Polyamide 1212, Polyamide PA6T/6I, Poly-m-Xylylenadipamid (PA MXD6), Polyamide 6/6T, Polyamide PA6T/66 or PA4T/46.

13. The material according to claim 1, wherein the thermoplastic polymer or copolymer is a polyolefine selected from the group of polyethylene and polypropylene.

14. The material according to claim 1, wherein at least one additive or filler is added to the thermoplastic polymer before or after the heat treatment, wherein the additive is compounded into the polymer or mixed with the thermoplastic polymer by dry blending or fusion joining.

15. The material of claim 1, wherein the powdered material includes at least first and second thermoplastic polymers, and wherein:
   the first thermoplastic polymer has been treated by heat to modify at least one of the melting temperature and the recrystallization temperature; and
   the second thermoplastic polymer has been treated by heat to modify at least one of the melting temperature, the recrystallization temperature and the melt enthalpy.

16. A solid object formed by additive manufacturing of at least one powdered material according to any one of claims 1, 3, 7, 8, 9, 10, 11, 13, 14 and 15 wherein at least one thermoplastic polymer has been treated by heat to modify at least one of the melting temperature, the recrystallization temperature and the melt enthalpy.

17. The solid object of claim 16, wherein the at least one additive or filler is added to the polymer before or after the heat treatment.

18. A method of preparing a material in powdered form for additive manufacturing having a narrowed melting curve relative to untreated material according to claim 1, the method comprising: heating a thermoplastic polymer with preexisting crystalline states under inert gas, starting at a specified temperature, to modify at least one of melting temperature (Tm), recrystallization temperature (Trc) and the melt enthalpy (ΔHm).

19. The method of claim 18, wherein the heating comprises: heating the thermoplastic polymer at a specified pressure, wherein the specified pressure is higher than atmospheric pressure at sea level.

20. The method of claim 19, wherein heating the thermoplastic polymer comprises: heating the thermoplastic polymer at the specified pressure and the inert gas is nitrogen.

21. The method of claim 18, wherein heating the thermoplastic polymer comprises: heating the thermoplastic polymer at a specified temperature for a specified duration.

22. The method of claim 18 in which the thermoplastic polymer is exposed to temperature T by heating in an oven.

23. The method of claim 18 in which the thermoplastic polymer is exposed to temperature T by irradiating with electromagnetic radiation or particle radiation.

24. The method of claim 18 in which the thermoplastic polymer is exposed to temperature T by irradiating it with IR radiation or microwave radiation.

25. The method of claim 18 in which the thermal energy for reaching temperature T and keeping the temperature T is supplied to the polymer partially or completely by means of mechanical treatment.

26. The method of claim 18 in which the thermoplastic polymer is exposed to temperature T by heating it in a fluidized bed in inert gas atmosphere.

27. The method of claim 18, wherein the specified temperature is near a melting onset, and wherein the melting onset is a temperature at which onset of melting occurs for the polymer before it has been treated by heat.

28. The method of claim 18, wherein heating the thermoplastic polymer comprises: heating the thermoplastic polymer at the specified temperature by gradually increasing the polymer's temperature as it approaches melting onset.

29. The method of claim 18, wherein heating the thermoplastic polymer comprises: heating the thermoplastic polymer while keeping it in a fluidized state.

30. The method of claim 18, wherein heating the thermoplastic polymer comprises: heating the thermoplastic polymer at least twice, including at least: a first time at a first specified temperature for a first specified duration; and a second time at a second specified temperature for a second specified duration.

31. The method of claim 30, wherein the first specified temperature is different from the second specified temperature.

32. The method of claim 30, wherein the first specified duration is different from the second specified duration.

33. The method of claim 18, wherein heating the thermoplastic polymer comprises: heating the thermoplastic polymer to increase a difference between the inciting temperature and the recrystallization temperature and/or the melt enthalpy.

34. The method of claim 18, wherein the melting temperature is a first melting temperature when the thermoplastic polymer is melted a first time, wherein the melting temperature is a second melting temperature when the thermoplastic polymer is melted a second time, and wherein heating the thermoplastic polymer comprises: heating the thermoplastic polymer to increase a difference between the first melting temperature and the second melting temperature.

35. The method of claim 18, wherein heating the thermoplastic polymer comprises: heating the powder to increase a temperature at which onset of melting occurs for the polymer.

36. The method of claim 18, wherein heating the thermoplastic polymer comprises: heating the thermoplastic polymer to reduce a temperature at which onset of recrystallization occurs for the polymer.

37. The method of claim 18, wherein the at least one thermoplastic polymer is a polyamide or a semi-aromatic polyamide, respectively, selected from Polyamide 6, Polyamide 11, Polyamide 12, Polyamide 46, Polyamide 66, Polyamide 1010, Polyamide 1012, Polyamide 1112, Polyamide 1212, Polyamide PA6T/6I, Poly-m-Xylylenadipamid (PA MXD6), Polyamide 6/6T or Polyamide PA6T/66, PA4T/46.

38. The method of claim 18, wherein the material includes at least first and second thermoplastic polymers, and wherein heating the thermoplastic polymer comprises: heating the first thermoplastic polymer to modify at least one of: the melting temperature, the recrystallization temperature and the melt enthalpy; and heating the second thermoplastic polymer to modify at least one of: the melting temperature, the recrystallization temperature and the melt enthalpy.

39. The method of claim 38, wherein heating the thermoplastic polymer comprises: heating the first and second thermoplastic polymers together.

* * * * *